(12) United States Patent
Revaud

(10) Patent No.: US 12,530,784 B2
(45) Date of Patent: Jan. 20, 2026

(54) VEHICLE SPEED ESTIMATION SYSTEMS AND METHODS

(71) Applicant: NAVER CORPORATION, Gyeonggi-do (KR)

(72) Inventor: Jérome Revaud, Meylan (FR)

(73) Assignee: NAVER CORPORATION, Gyeonggi-Do (KR)

( * ) Notice: Subject to any disclaimer, the term of this patent is extended or adjusted under 35 U.S.C. 154(b) by 485 days.

(21) Appl. No.: 17/365,389

(22) Filed: Jul. 1, 2021

(65) Prior Publication Data

US 2023/0019731 A1    Jan. 19, 2023

(51) Int. Cl.
*G06T 7/215* (2017.01)
*G06T 7/246* (2017.01)

(52) U.S. Cl.
CPC .............. *G06T 7/215* (2017.01); *G06T 7/251* (2017.01); *G06T 2207/20081* (2013.01); *G06T 2207/20084* (2013.01)

(58) Field of Classification Search
CPC ...... G06T 7/215; G06T 7/251; G06T 2207/20081; G06T 2207/20084; G06T 2207/30236; G06T 2207/30241; G06T 7/246
USPC ........................................................ 382/103
See application file for complete search history.

(56) References Cited

U.S. PATENT DOCUMENTS

| | | | |
|---|---|---|---|
| 2014/0050357 A1* | 2/2014 | Benhimane | G06T 7/579 |
| | | | 382/103 |
| 2019/0311494 A1* | 10/2019 | Ramalingam | G06F 18/2413 |
| 2020/0265241 A1* | 8/2020 | Bruso | G06V 10/763 |
| 2020/0293816 A1 | 9/2020 | Neser | |
| 2020/0364892 A1 | 11/2020 | Ko et al. | |
| 2020/0372679 A1 | 11/2020 | Javan Roshtkhari et al. | |
| 2021/0166049 A1* | 6/2021 | Tariq | G06V 10/25 |
| 2021/0209797 A1 | 7/2021 | Lee et al. | |
| 2021/0264175 A1* | 8/2021 | Zhang | G08G 1/166 |
| 2021/0264196 A1* | 8/2021 | Abbeloos | G06V 20/58 |
| 2021/0342600 A1 | 11/2021 | Westmacott et al. | |

(Continued)

FOREIGN PATENT DOCUMENTS

| | | | |
|---|---|---|---|
| CN | 112284380 A | * | 1/2021 |
| KR | 20160092958 A | | 8/2016 |

(Continued)

OTHER PUBLICATIONS

Ashish Vaswani, Noam Shazeer, Niki Parmar, Jakob Uszkoreit, Llion Jones, Aidan N Gomez, Lukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pp. 5998-6008, Curran Associates, Inc., 2017.

(Continued)

*Primary Examiner* — Jennifer Mehmood
*Assistant Examiner* — Heath E. Wells

(57) ABSTRACT

A speed estimation system includes: a detection module configured to: detect an object on a surface in an image captured using a camera; and generate a bounding box around the object; a Jacobian module configured to generate a Jacobian for the object based on the bounding box; and a speed module configured to determine a speed that the object is traveling on the surface based on the Jacobian.

26 Claims, 15 Drawing Sheets

(4 of 15 Drawing Sheet(s) Filed in Color)

(56) References Cited

U.S. PATENT DOCUMENTS

| | | | |
|---|---|---|---|
| 2021/0403050 A1 | 12/2021 | Gan et al. | |
| 2022/0051031 A1* | 2/2022 | Li | G06V 20/56 |
| 2022/0061031 A1* | 2/2022 | Park | H04L 5/0094 |
| 2022/0245831 A1* | 8/2022 | Revaud | G06T 7/248 |
| 2022/0366606 A1* | 11/2022 | Ma | G06T 7/80 |
| 2023/0132646 A1* | 5/2023 | Ratti | H04N 7/181 |
| | | | 348/159 |

FOREIGN PATENT DOCUMENTS

| | | |
|---|---|---|
| KR | 20170035272 A | 3/2017 |
| KR | 102052833 B1 | 12/2019 |
| KR | 20200053920 A | 5/2020 |
| WO | WO-2022000094 A1 | 1/2022 |

OTHER PUBLICATIONS

U.S. Appl. No. 17/365,439, filed Jul. 1, 2021, Jérome Revaud.

U.S. Appl. No. 17/162,353, filed Jan. 29, 2021, Jérome Revaud.

A. Kurniawan, A. Ramadlan, and E. M. Yuniarno. Speed Monitoring for Multiple Vehicle Using Closed Circuit Television (CCTV) Camera. 2018.

Abhijit Kundu, Yin Li, and James M. Rehg. 3DRCNN: Instance-Level 3D Object Reconstruction via Render-and-Compare. In 2018 IEEE Conference on Computer Vision and Pattern Recognition, CVPR 2018, Salt Lake City, UT, USA, Jun. 18-22, 2018, pp. 3559-3568. IEEE Computer Society, 2018.

Adrien Lessard, Francois Belisle, Guillaume-Alexandre Bilodeau, and Nicolas Saunier. The Counting App, or How to Count Vehicles in 500 Hours of Video. In 2016 IEEE Conference on Computer Vision and Pattern Recognition Workshops (CVPRW), pp. 1592-1600, Las Vegas, NV, USA, Jun. 2016. IEEE.

Alex Bewley, ZongYuan Ge, Lionel Ott, Fabio Tozeto Ramos, and Ben Upcroft. Simple online and realtime tracking. In ICIP, pp. 3464-3468. IEEE, 2016.

Alireza Makhzani, Jonathon Shlens, Navdeep Jaitly, Ian Goodfellow, and Brendan Frey. Adversarial autoencoders. arXiv preprint arXiv:1511.05644, 2015.

Amit Kumar, Pirazh Khorramshahi, Wei-An Lin, Prithviraj Dhar, Jun-Cheng Chen, and Rama Chellappa. A Semi-Automatic 2D Solution for Vehicle Speed Estimation from Monocular Videos. In CVPRW, pp. 137-1377, Salt Lake City, UT, USA, Jun. 2018. IEEE.

Arsalan Mousavian, Dragomir Anguelov, John Flynn, and Jana Kosecka. 3D Bounding Box Estimation Using Deep Learning and Geometry. In 2017 IEEE Conference on Computer Vision and Pattern Recognition, CVPR 2017, Honolulu, HI, USA, Jul. 21-26, 2017, pp. 5632-5640. IEEE Computer Society, 2017.

C. Maduro, K. Batista, P. Peixoto, and J. Batista. Estimation of vehicle velocity and traffic intensity using rectified images. In 2008 15th IEEE International Conference on Image Processing, pp. 777-780, Oct. 2008. ISSN: 2381-8549.

Chan Antoni B. and Vasconcelos Nuno. Classification and retrieval of traffic video using autoregressive stochastic processes. 2005.

David Fernández Llorca, Antonio Hernández Martínez, and Iván García Daza. Vision-based Vehicle Speed Estimation for ITS: A Survey. arXiv:2101.06159 [cs], Jan. 2021. arXiv: 2101.06159.

Diederik P. Kingma and Jimmy Ba. Adam: A method for stochastic optimization. In Yoshua Bengio and Yann LeCun, editors, 3rd International Conference on Learning Representations, ICLR 2015, San Diego, CA, USA, May 7-9, 2015, Conference Track Proceedings, 2015.

Diogo Luvizon, Bogdan Tomoyuki Nassu, and Rodrigo Minetto. A Video-Based System for Vehicle Speed Measurement in Urban Roadways. IEEE Transactions on Intelligent Transportation Systems, pp. 1-12, Sep. 2016.

Fabian Manhardt, Wadim Kehl, and Adrien Gaidon. ROI-10D: Monocular Lifting of 2D Detection to 6D Pose and Metric Shape. In IEEE Conference on Computer Vision and Pattern Recognition, CVPR 2019, Long Beach, CA, USA, Jun. 16-20, 2019, pp. 2069-2078. Computer Vision Foundation / IEEE, 2019.

Frederick W. Cathey and Daniel J. Dailey. Mathematical theory of image straightening with applications to camera calibration. In IEEE Intelligent Transportation Systems Conference, ITSC 2006, Toronto, Ontario, Canada, Sep. 17-20, 2006, pp. 1364-1369. IEEE, 2006.

Ghazi Al-Naymat, Sanjay Chawla, and Javid Taheri. SparseDTW: A Novel Approach to Speed up Dynamic Time Warping. arXiv: 1201.2969 [cs], Jan. 2012. arXiv: 1201.2969.

Heba A. Kurdi. Review of Closed Circuit Television (CCTV) Techniques for Vehicles Traffic Management. International Journal of Computer Science and Information Technology, 6:199-206, Apr. 2014.

Hou-Ning Hu, Qi-Zhi Cai, DequanWang, Ji Lin, Min Sun, Philipp Krahenbuhl, Trevor Darrell, and Fisher Yu. Joint Monocular 3D Vehicle Detection and Tracking. In ICCV, p. 10, 2019.

Huikun Bi, Zhong Fang, Tianlu Mao, Zhaoqi Wang, and Zhigang Deng. Joint Prediction for Kinematic Trajectories in Vehicle-Pedestrian- Mixed Scenes. In ICCV, p. 10, 2019.

Jacob Devlin, Ming-Wei Chang, Kenton Lee, and Kristina Toutanova. BERT: pre-training of deep bidirectional transformers for language understanding. In Jill Burstein, Christy Doran, and Thamar Solorio, editors, Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers), pp. 4171-4186. Association for Computational Linguistics, 2019.

Jakub Sochor, et al., *Traffic Surveillance Camera Calibration by 3D Model Bounding Box Alignment for Accurate Vehicle Speed Measurement*, Computer Vision and Image Understanding, 161:87-98, Aug. 2017, arXiv: 1702.06451.

Jakub Sochor, Jakub panhel, and Adam Herout. BoxCars: Improving Fine-Grained Recognition of Vehicles using 3-D Bounding Boxes in Traffic Surveillance. IEEE Trans. Intell. Transport. Syst., 20(1):97-108, Jan. 2019. arXiv: 1703.00686.

Jakub Sochor, Jakub Spanhel, Roman Juranek, Petr Dobes, and Adam Herout. Graph@FIT Submission to the NVIDIA AI City Challenge 2018. In 2018 IEEE/CVF Conference on Computer Vision and Pattern Recognition Workshops (CVPRW), pp. 77-777, Salt Lake City, UT, USA, Jun. 2018. IEEE.

Jakub Sochor, Roman Juranek, and Adam Herout. Traffic Surveillance Camera Calibration by 3D Model Bounding Box Alignment for Accurate Vehicle Speed Measurement. Computer Vision and Image Understanding, 161:87-98, Aug. 2017. arXiv: 1702.06451.

Jakub Sochor, Roman Juránek, Jakub Spanhel, Lukás Marsík, Adam Siroký, Adam Herout, and Pavel Zemcík. Comprehensive Data Set for Automatic Single Camera Visual Speed Measurement. IEEE Transactions on Intelligent Transportation Systems, 20(5):1633-1643, May 2019.

Jakub Španhel, Jakub Sochor, Roman Juránek, Petr Dobeš, Vojtech Bartl, and Adam Herout. Learning Feature Aggregation in Temporal Domain for Re-Identification. arXiv:1903.05244 [cs], Mar. 2019. arXiv: 1903.05244.

Jing Li, Shuo Chen, Fangbing Zhang, Erkang Li, Tao Yang, and Zhaoyang Lu. An Adaptive Framework for Multi-Vehicle Ground Speed Estimation in Airborne Videos. Remote Sensing, 11(10):1241, Jan. 2019.

Julian Nubert, Nicholas Giai Truong, Abel Lim, Herbert Ilhan Tanujaya, Leah Lim, and Mai Anh Vu. Traffic Density Estimation using a Convolutional Neural Network. Technical report, 2018.

Junaid Ahmed Ansari, Sarthak Sharma, Anshuman Majumdar, J. Krishna Murthy, and K. Madhava Krishna. The Earth Ain't Flat: Monocular Reconstruction of Vehicles on Steep and Graded Roads from a Moving Camera. In 2018 IEEE/RSJ International Conference on Intelligent Robots and Systems, IROS 2018, Madrid, Spain, Oct. 1-5, 2018, pp. 8404-8410. IEEE, 2018.

Kaiming He, Georgia Gkioxari, Piotr Dollár, and Ross Girshick. Mask R-CNN. arXiv:1703.06870 [cs], Jan. 2018. arXiv: 1703.06870.

Lazaros Grammatikopoulos, George Karras, and Elli Petsa. Automatic estimation of vehicle speed from uncalibrated video sequences. 2005.

(56) References Cited

OTHER PUBLICATIONS

Markéta Dubská and Adam Herout. Real Projective Plane Mapping for Detection of Orthogonal Vanishing Points. In Proceedings of the British Machine Vision Conference 2013, pp. 90.1-90.11, Bristol, 2013. British Machine Vision Association.

Marketa Dubska, Adam Herout, and Jakub Sochor. Automatic Camera Calibration for Traffic Understanding. In Proceedings of the British Machine Vision Conference 2014, pp. 42.1-42.12, Nottingham, 2014. British Machine Vision Association.

Marketa Dubska, Adam Herout, Roman Juranek, and Jakub Sochor. Fully Automatic Roadside Camera Calibration for Traffic Surveillance. IEEE Transactions on Intelligent Transportation Systems, 16(3):1162-1171, Jun. 2015.

Panagiotis Giannakeris, Vagia Kaltsa, Konstantinos Avgerinakis, Alexia Briassouli, Stefanos Vrochidis, and Ioannis Kompatsiaris. Speed Estimation and Abnormality Detection from Surveillance Cameras. In 2018 IEEE/CVF Conference on Computer Vision and Pattern Recognition Workshops (CVPRW), pp. 93-936, Salt Lake City, UT, USA, Jun. 2018. IEEE.

Paul Wohlhart and Vincent Lepetit. Learning descriptors for object recognition and 3D pose estimation. In IEEE Conference on Computer Vision and Pattern Recognition, CVPR 2015, Boston, MA, USA, Jun. 7-12, 2015, pp. 3109-3118. IEEE Computer Society, 2015.

PyTorch: Source Code For Torchvision. Models. Detection>mask_RCNN ; Torch Contributors. accessed Jul. 7, 2021. < https://pytorch.org/vision/stable/_modules/torchvision/models/detection/mask_rcnn.html.>.

R.L. Graham, *An Efficient Algorithm for Determining the Convex Hull of a Finite Planar Set*, Information Processing Letters, 1(4):132-133, Jun. 1972.

Robert Tibshirani. Regression Shrinkage and Selection via the Lasso. Journal of the Royal Statistical Society. Series B (Methodological), 58(1):267-288, 1996. Publisher: [Royal Statistical Society, Wiley].

Roberto Cipolla, Tom Drummond, and Duncan Robertson. Camera Calibration from Vanishing Points in Image of Architectural Scenes. In BMVC, vol. 2, 1999.

Roman Juranek, Adam Herout, Marketa Dubska, and Pavel Zemcik. Real-Time Pose Estimation Piggybacked on Object Detection. In 2015 IEEE International Conference on Computer Vision (ICCV), pp. 2381-2389, Santiago, Dec. 2015. IEEE.

Romil Bhardwaj, Gopi Krishna Tummala, Ganesan Ramalingam, Ramachandran Ramjee, and Prasun Sinha. AutoCalib: Automatic Traffic Camera Calibration at Scale. p. 10, 2017.

Sabbani Imad, Perez-uribe Andres, Bouattane Omar, and El Moudni Abdellah. Deep convolutional neural network architecture for urban traffic flow estimation. IJCSNS, 2018.

Shaoqing Ren, Kaiming He, Ross Girshick, and Jian Sun. Faster R-CNN: Towards Real-Time Object Detection with Region Proposal Networks. IEEE Transactions on Pattern Analysis and Machine Intelligence, 39(6):1137-1149, Jun. 2017. Conference Name: IEEE Transactions on Pattern Analysis and Machine Intelligence.

Tingting Huang. Traffic Speed Estimation from Surveillance Video Data. 2018.

Todd Nelson Schoepflin and Daniel J Dailey. Algorithms for Estimating Mean Vehicle Speed Using Uncalibrated Traffic Management Cameras. Technical report, 2003.

V. Bartl and A. Herout. OptInOpt: Dual Optimization for Automatic Camera Calibration by Multi-Target Observations. In 2019 16th IEEE International Conference on Advanced Video and Signal Based Surveillance (AVSS), pp. 1-8, Sep. 2019. ISSN: 2643-6213.

Viktor Kocur. Perspective transformation for accurate detection of 3D bounding boxes of vehicles in traffic surveillance. In Proceedings of the 24th Computer Vision Winter Workshop, 2019.

Vojtech Bartl, Jakub Spanhel, Petr Dobes, Roman Juranek, and Adam Herout. Automatic camera calibration by landmarks on rigid objects. Machine Vision and Applications, 32(1):2, Oct. 2020.

Vojtech Bartl, Roman Juranek, Jakub Spanhel, and Adam Herout. PlaneCalib: Automatic Camera Calibration by Multiple Observations of Rigid Objects on Plane. In 2020 Digital Image Computing: Techniques and Applications (DICTA), pp. 1-8, Melbourne, Australia, Nov. 2020. IEEE.

Will Schroeder, Ken Martin, and Bill Lorensen. The Visualization Toolkit. 3rd Edition. 2002.

Xiao-Chen He and N. H. C. Yung. A Novel Algorithm for Estimating Vehicle Speed from Two Consecutive Images. In 8th IEEE Workshop on Applications of Computer Vision (WACV 2007), Feb. 20-21, 2007, Austin, Texas, USA, p. 12. IEEE Computer Society, 2007.

Zheng Tang, Gaoang Wang, Tao Liu, Young-Gun Lee, Adwin Jahn, Xu Liu, Xiaodong He, and Jenq-Neng Hwang. Multiple-Kernel Based Vehicle Tracking Using 3D Deformable Model and Camera Self-Calibration. CoRR, abs/1708.06831, 2017. _eprint: 1708.06831.

Zheng Tang, Milind Naphade, Stan Birchfield, Jonathan Tremblay, William Hodge, Ratnesh Kumar, Shuo Wang, and Xiaodong Yang. PAMTRI: Pose-Aware Multi-Task Learning for Vehicle Re-Identification Using Highly Randomized Synthetic Data. In ICCV, p. 10, 2019.

Zhongdao Wang, Luming Tang, Xihui Liu, Zhuliang Yao, Shuai Yi, Jing Shao, Junjie Yan, Shengjin Wang, Hongsheng Li, and Xiaogang Wang. Orientation Invariant Feature Embedding and Spatial Temporal Regularization for Vehicle Re-identification. In IEEE International Conference on Computer Vision, ICCV 2017, Venice, Italy, Oct. 22-29, 2017, pp. 379-387. IEEE Computer Society, 2017.

Zhuang, B., & Chandraker, M. (2021). Fusing the Old with the New: Learning Relative Camera Pose with Geometry-Guided Uncertainty. arXiv preprint arXiv:2104.08278.

Dong, H., Wen, M., & Yang, Z. (2019). Vehicle Speed Estimation Based on 3D ConvNets and Non-Local Blocks. Future Internet, 11(6), 123.

"Inter-Vehicle Distance Estimation Method Based on Monocular Vision Using 3D Detection" Pub. IEEE Transactions on Vehicular Technology vol. 69, No. 5, May 2020 by Ting Zhe, Liqin Huang, Qiang Wu, Jianjia Zhang, Chenhao Pei and Liangyu Li. (Year: 2020).

James S Bergstra, Rémi Bardenet, Yoshua Bengio, and Balázs Kégl. *Algorithms for Hyper-Parameter Optimization*. In NeurIPS, p. 9, 2011. https://papers.nips.cc/paper/2011/file/86e8f7ab32cfd12577bc2619bc635690-Paper.pdf.

Korean Office Action for corresponding Korean Application No. 10-2022-0010239 dated Mar. 8, 2024.

* cited by examiner

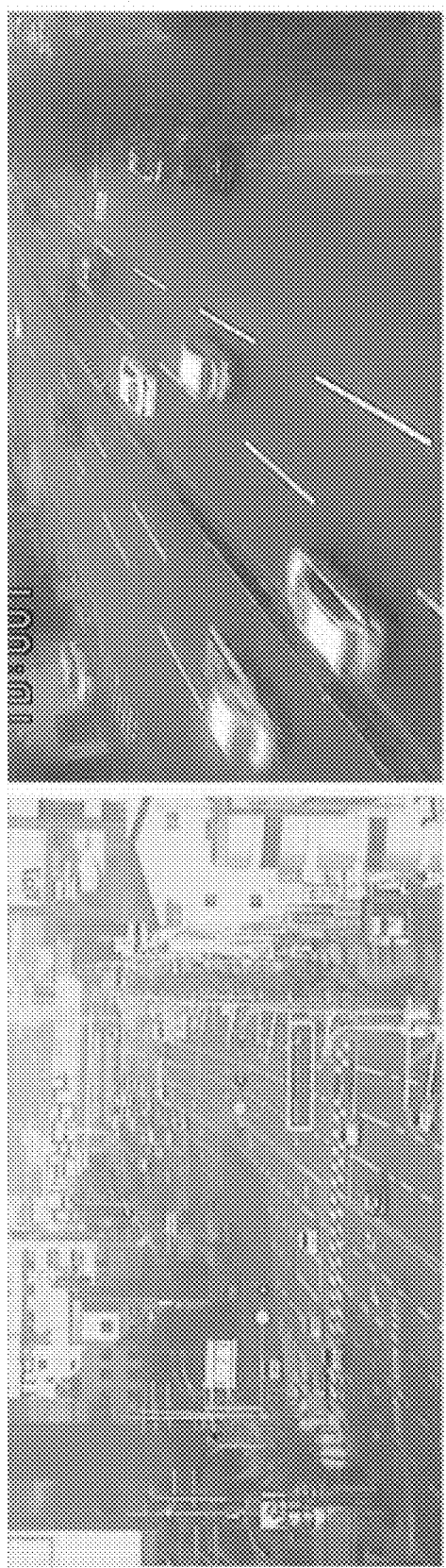
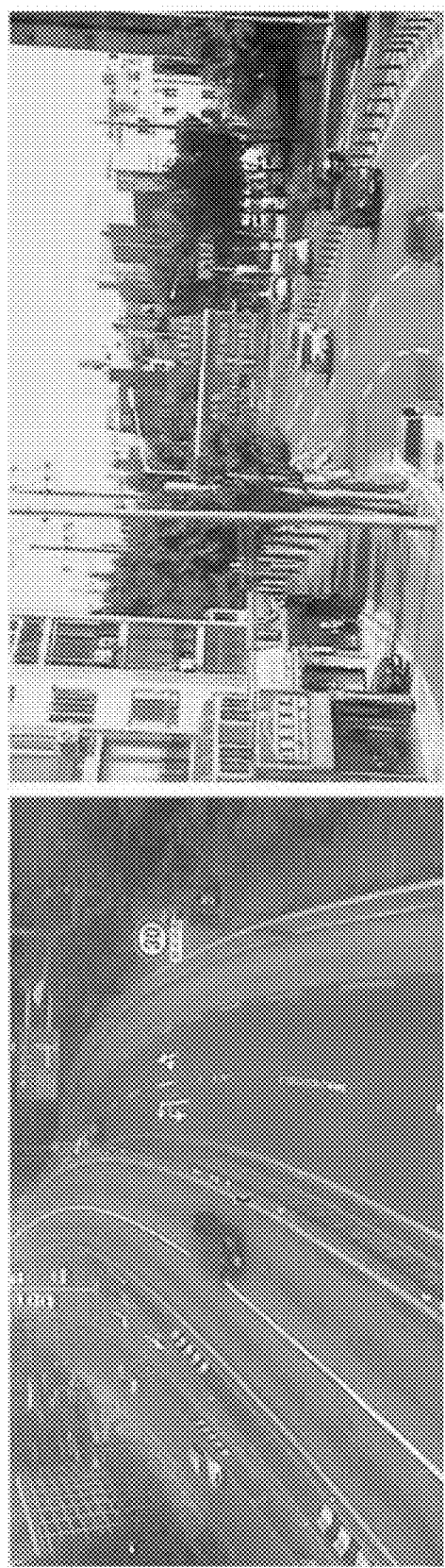
FIG. 3

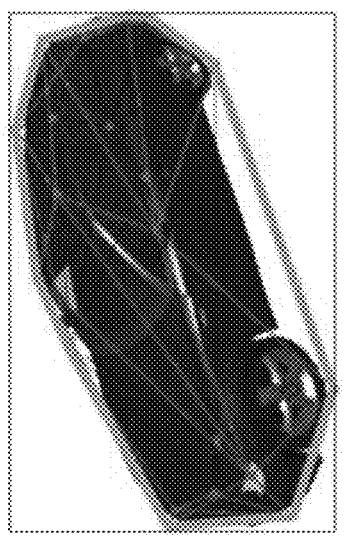
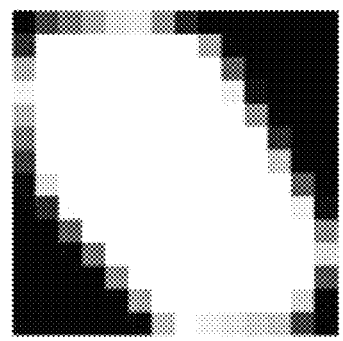
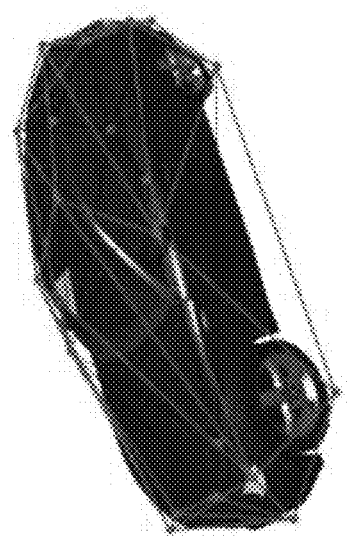
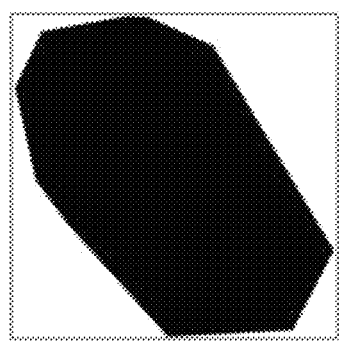
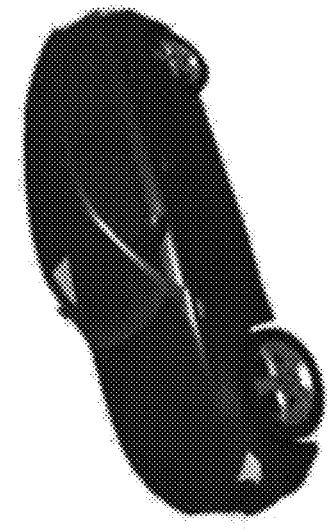
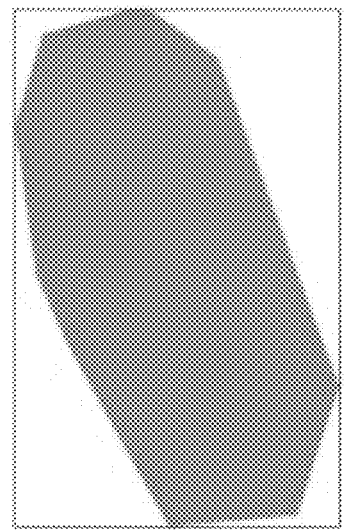
FIG. 9

VEHICLE SPEED ESTIMATION SYSTEMS AND METHODS

CROSS-REFERENCE TO RELATED APPLICATIONS

The present disclosure is related to U.S. patent application Ser. No. 17/162,353, filed 29 Jan. 2021, and the patent application titled Untrained Systems and Methods for Vehicle Speed Estimation, U.S. patent application Ser. No. 17/365,439, filed on Jul. 1, 2021. The entire disclosures of the applications referenced above are incorporated herein by reference.

FIELD

The present disclosure relates to speed estimation systems and more particularly to systems and methods for estimating speed vehicles from video, such as from a closed circuit television (CCTV) camera.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cameras, such as closed circuit television (CCTV) cameras may be used in various environments, such as for surveillance and traffic monitoring. Other hardware can also be used for traffic monitoring. For example, radar sensors can be installed near roadways and used to monitor traffic. As another example, inductive loops can be installed in roadways (e.g., near intersections) and used to monitor traffic. Such hardware, however, may be expensive and cannot be installed quickly and/or on a large scale. For example, inductive loops are typically installed within or below a road surface.

Systems that use cameras for traffic speed monitoring require accurate calibration. Such camera systems, however, may not be calibrated or may require constant recalibration if they are moving, so a homography of the road in these situations may be unknown. Geometry (e.g., 3D shape) of the roadway in view may also not be accounted for, potentially limiting the usefulness to roadways that are flat and straight. There continues therefore to be a need for systems and methods adapted to estimate the speed of objects that appear in videos without the need of camera calibration.

SUMMARY

In a feature, a speed estimation system includes: a detection module configured to: detect an object on a surface in an image captured using a camera; and generate a bounding box around the object; a Jacobian module configured to generate a Jacobian for the object based on the bounding box; and a speed module configured to determine a speed that the object is traveling on the surface based on the Jacobian.

In further features, the Jacobian module is configured to generate the Jacobian using a neural network.

In further features, the neural network is trained to regress Jacobians given bounding boxes around objects.

In further features, the object is a vehicle.

In further features, the bounding box is one of: a two dimensional (2D) rectangle; and a two dimensional (2D) polygon.

In further features, a training module is configured to train the neural network by minimizing an energy function configured to generate energy values based on an error function between: the Jacobian; and a predetermined Jacobian.

In further features, the energy function is one of: an intersection over union error function; and a scaled intersection over union error function.

In a feature, a speed estimation system includes: a detection module configured to: detect an object on a surface in images captured using a camera over a period; and generate bounding boxes around the object in the images, respectively; a Jacobian module configured to generate a set of Jacobians for the object based on the bounding boxes, respectively; a homography module configured to generate a homography based on the set of Jacobians; and a speed module configured to determine a speed that the object is traveling on the surface using the homography.

In further features, the Jacobian module is configured to generate the set of Jacobians using a neural network.

In further features, the neural network is trained to regress Jacobians given bounding boxes around objects.

In further features, the object is a vehicle.

In further features, a training module is configured to train the neural network by minimizing an energy function configured to generate energy values based on an error function between: ones of the Jacobians; and predetermined Jacobians, respectively.

In further features, the energy function is one of: an intersection over union error function; a scaled intersection over union error function; a L1 loss function; and a normalized L1 loss function.

In further features, the homography module is configured to: remove outlier ones of the Jacobians; and determine the homography based on the remaining ones of the Jacobians of the set.

In a feature. a speed estimation method includes: detecting an object on a surface in an image captured using a camera; generating a bounding box around the object; generating a Jacobian for the object based on the bounding box; and determining a speed that the object is traveling on the surface based on the Jacobian.

In further features, generating the Jacobian includes generating the Jacobian using a neural network.

In further features, generating the Jacobian includes generating the Jacobian using a neural network trained to regress Jacobians given bounding boxes around objects.

In further features, the object is a vehicle.

In further features, the bounding box is one of: a two dimensional (2D) rectangle; and a two dimensional (2D) polygon.

In further features, generating the Jacobian includes generating the Jacobian using a neural network, and the speed estimation method further includes training the neural network by minimizing an energy function configured to generate energy values based on an error function between: the Jacobian; and a predetermined Jacobian.

In further features, the energy function is one of: an intersection over union error function; and a scaled intersection over union error function.

In a feature, a speed estimation method includes: detecting an object on a surface in images captured using a camera over a period; generating bounding boxes around the object in the images, respectively; generating a set of Jacobians for the object based on the bounding boxes, respectively; generating a homography based on the set of Jacobians; and determining a speed that the object is traveling on the surface using the homography.

In further features, generating the set of Jacobians includes generating the set of Jacobians using a neural network.

In further features, the speed estimation method further includes training the neural network to regress Jacobians given bounding boxes around objects.

In further features, the object is a vehicle.

In further features, the speed estimation method further includes training the neural network by minimizing an energy function configured to generate energy values based on an error function between: ones of the Jacobians; and predetermined Jacobians, respectively.

In further features, the energy function is one of: an intersection over union error function; a scaled intersection over union error function; a L1 loss function; and a normalized L1 loss function.

In further features, the speed estimation method further includes: removing outlier ones of the Jacobians; and determining the homography based on the remaining ones of the Jacobians of the set.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein:

FIG. 3 includes example images of portions of roads captured using cameras with vehicles moving on the roads;

FIG. 9 includes example bounding boxes and polygons;

In the drawings, reference numbers may be reused to identify similar and/or identical elements.

DETAILED DESCRIPTION

The present application involves a data-driven approach to determine speeds of objects (e.g., vehicles) using video from cameras (e.g., closed circuit television cameras) that are uncalibrated (i.e., without known global camera parameters). Images used are not subject to any image processing prior to being used for speed determination. Camera calibration and scene (road) geometry is determined based on object bounding boxes. Training is performed to minimize an energy function corresponding to a 3 dimensional scene reconstruction error that utilizes the fact that vehicles have similar 3D shapes and normalized dimensions.

The present application involves training a network to determine local and global mappings between pixel coordinates and distance coordinates without global parameters describing a local geometry. A training module trains the network to produce one or more Jacobians, each of which provides a relative (local) mapping between two spaces of different dimensions (e.g., pixel and distance), by minimizing an energy function to minimize differences between bounding boxes and predicted bounding boxes. The predicted bounding boxes may be generated to provide smooth tracks to remove outliers and to correct for image boundary clipping and occlusion by other objects. A single Jacobian can be used to estimate an object's speed directly from the Jacobian. A set of Jacobians over a period can be used to generate a homography, which includes camera parameters, and which provides a linear transformation between two planes (i.e., a global mapping, e.g., between the pixel coordinate system and the (real-world) distance coordinate system), and the homography can be used to estimate sped at any point over the period.

Figure 1:
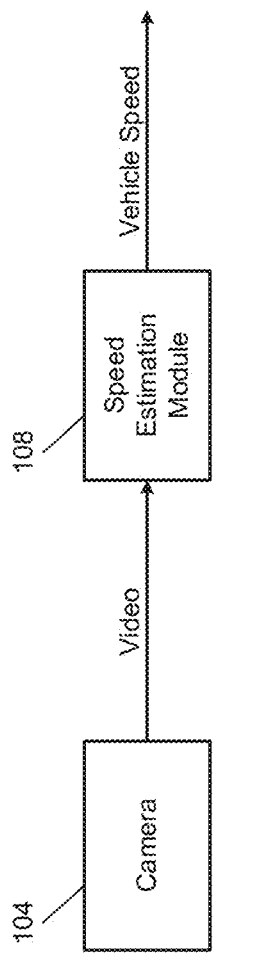
FIG. 1 is a functional block diagram of an example vehicle speed estimation system.

FIG. 1 is a functional block diagram of an example vehicle speed estimation system. While the example of vehicle speed estimation will be described, the present application is also applicable to estimating speeds of other types of objects (e.g., pedestrians, cyclists, runners, tractors, mountain bikers, boats, swimmers, skiers, snowmobilers, etc.) on surfaces (e.g., the ground and/or other types of paths, water, snow, etc.).

In the embodiment shown, a camera 104 captures video of a portion road over which vehicles travel. The road can be planar (no inclines and/or declines) and straight, the road can be planar and include one or more curves, the road can be non-planar (include one or more inclines and/or declines) and straight, or the road can be both non-planar and include one or more curves. The camera 104 captures images at a predetermined rate, such as 60 hertz (Hz), 120 Hz, etc. A time series of the images is used to form the video.

A speed estimation module 108 estimates the speed of a vehicle on the road using the images from the camera 104 as discussed further below. In various implementations, the speed estimation module 108 may estimate the speed of each vehicle on the road using the images from the camera 104. While the example of the video being captured using the camera 104 is provided, the present application is also applicable to estimating speed of a vehicle using video obtained via a network, such as the Internet, such as from one or more video sources (e.g., YouTube, video games, department of transportation, etc.) and/or databases. The present application is also applicable to video not generated by one or more cameras, such as animated video generated to include virtual vehicles on virtual surfaces (e.g., paths or ground).

The speed estimation module 108 may estimate the speed of each vehicle on the road using the images from the camera 104. The speed estimation module 108 may determine an average vehicle speed by averaging the speeds of all of the vehicles, respectively, on the road.

Figure 2:
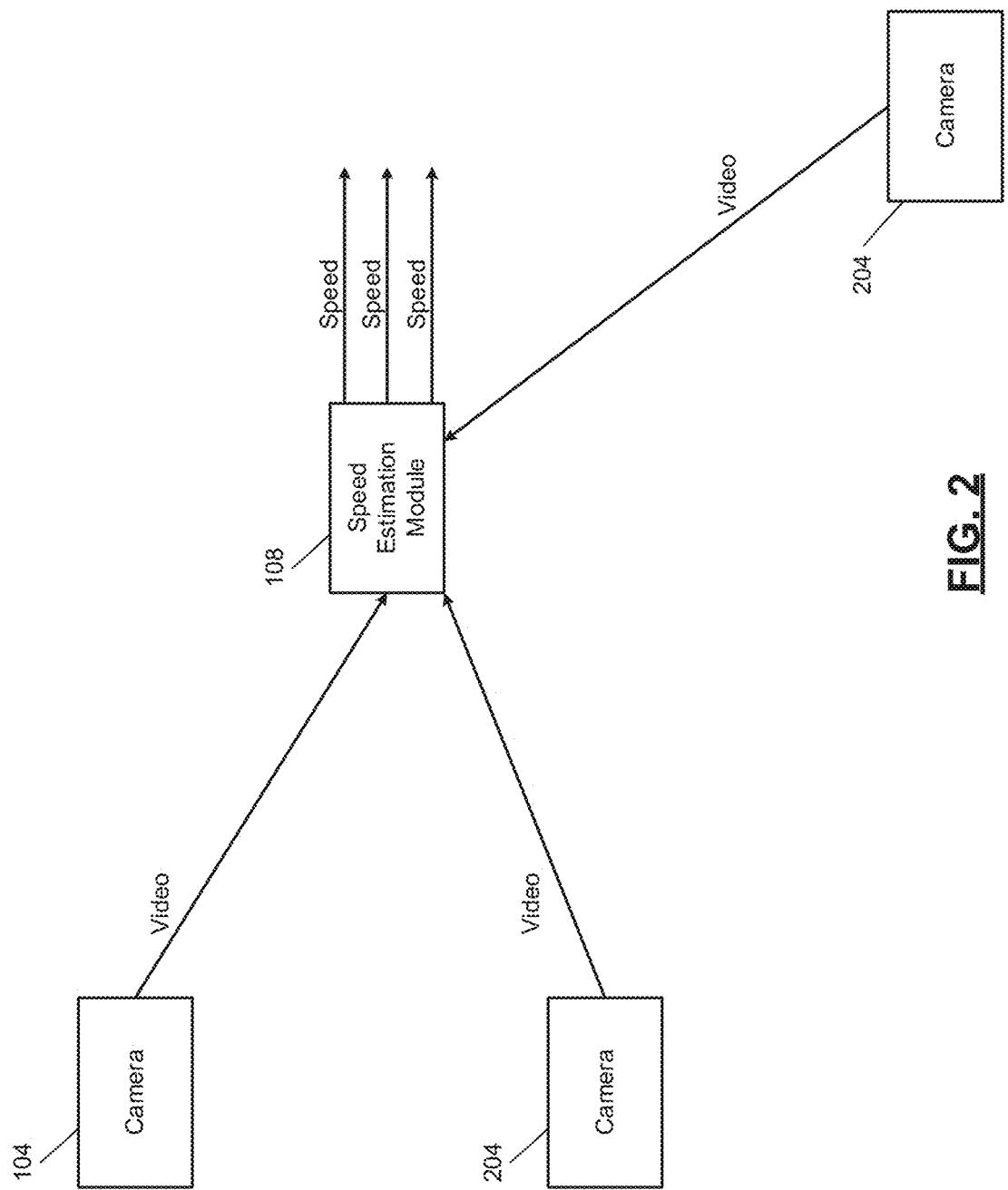
FIG. 2 is a functional block diagram of an example vehicle speed estimation system.

FIG. 2 is a functional block diagram of an example vehicle speed estimation system. As shown, the speed estimation module 108 may receive video from one or more additional cameras, such as cameras 204. The cameras 204 may capture video of different portions of different roads than the camera 104 and/or different parts of the same road as the camera 104. The speed estimation module 108 may estimate speeds of vehicles captured by each of the cameras 104 and 204.

The cameras may have a fixed field of view, or the cameras may be configured to tilt the field of view selectively upwardly and downwardly and/or pan the field of view selectively right and left. In various implementations, the cameras may be cameras of (mounted to) vehicles that move with the vehicles. FIG. 3 includes example images of portions of roads captured using cameras with vehicles moving on the roads. The locations of the cameras may be transmitted by the cameras or determined, for example, based a unique identifier of the camera transmitted with its video.

Figure 4:
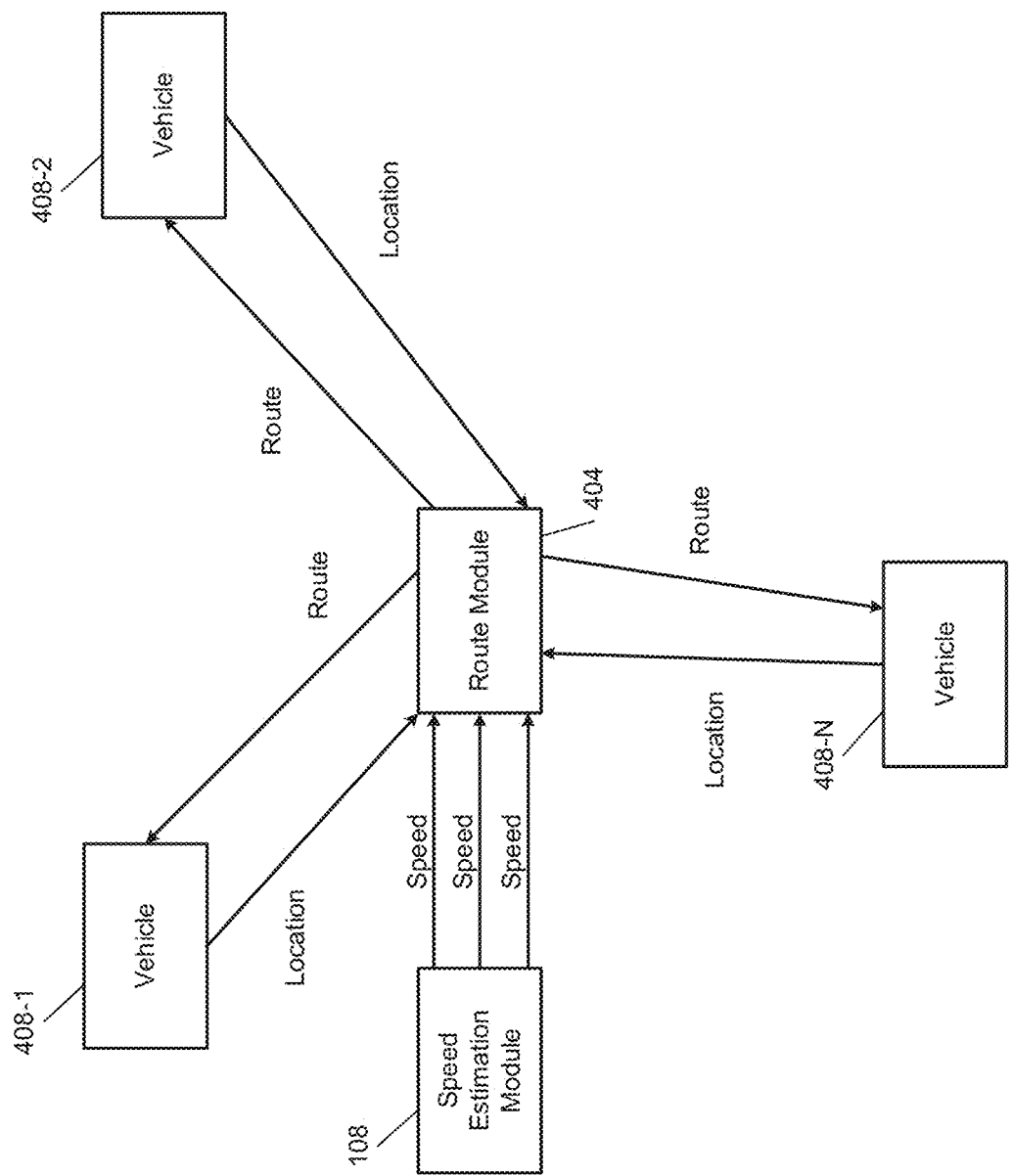
FIG. 4 includes an example implementation of a routing system for routing vehicle traffic.

Vehicle speeds estimated by the speed estimation module 108 may be used for one or more purposes. For example, FIG. 4 includes an example implementation of a routing system for routing vehicle traffic. The speed estimation module 108 may transmit the speeds of vehicles at various locations to a route module 404.

The route module 404 may determine a route for a vehicle to move from a starting location to a destination location based on the starting location, the destination location, and the vehicle speeds at one or more locations between starting and destination locations. For example, the route module 404 may determine the fastest possible route from the starting location to the destination location based on one or more of the vehicle speeds at various different locations and set the route for the vehicle to the fastest possible route.

Example vehicles 408-1, 408-2, 408-N ("vehicles 408") are shown, where N is an integer greater than or equal to 1. In various implementations, the vehicles 408 may be a fleet of autonomous vehicles, semi-autonomous vehicles, or non-autonomous (driver driven) vehicles. The vehicles 408 may navigate or provide directions (e.g., audibly and/or visually) for navigating to their respective destination locations according to the respective routes set by the route module 404.

The route module 404 may also selectively update the route of a vehicle while the vehicle is traveling to its destination location. Each of the vehicles 408 may wirelessly transmit its location to the route module 404. When the vehicle speeds at one or more locations along the present route decrease or fall below a predetermined speed, the route module 404 may update the route to avoid those one or more locations and to follow a route that will allow the vehicle to get to the destination location most quickly. While the example of vehicles 408 has been provided, the present application is also applicable to mobile devices, such as smart phones, tablets, etc. Also, while examples of routing have been provided, the routing module 404 may determine or adjust the route of a vehicle based on one or more of the vehicle speeds for one or more other reasons.

Figure 5:
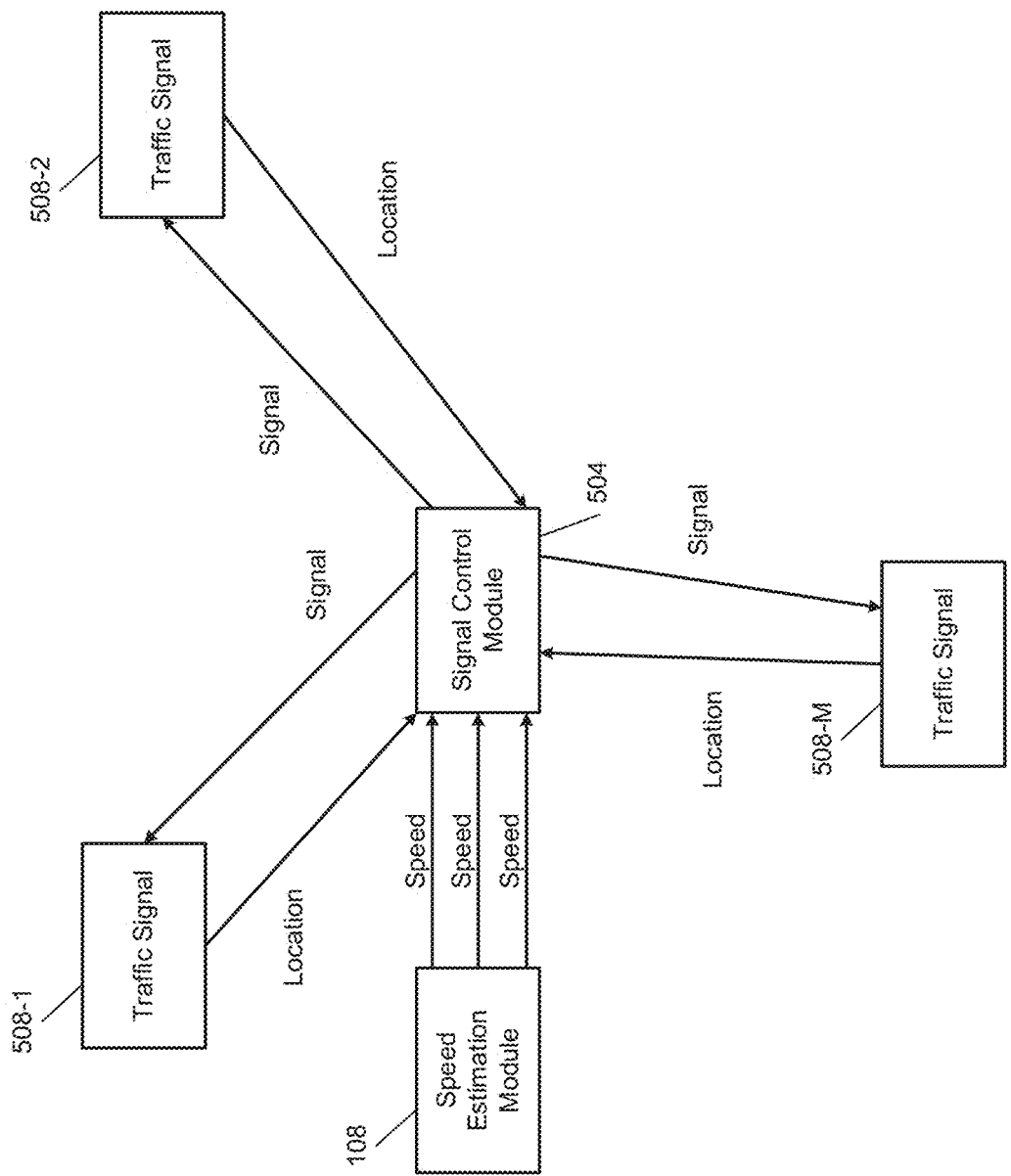
FIG. 5 includes an example implementation of a signaling system for traffic signaling.

FIG. 5 includes an example implementation of a signaling system for traffic signaling. The speed estimation module 108 may transmit the speeds of vehicles at various locations to a signal control module 504. The signal control module 504 may control timing of traffic signals 508-1, 508-2, 508-M, where M is an integer greater than or equal to 1, based on one or more of the vehicle speeds at or near their respective locations. For example, the signal control module 504 may control the traffic signal at an intersection to increase a period that vehicles are permitted to drive through the intersection in a direction when vehicle speeds in the direction at or near the intersection are less than a predetermined speed or have been less than the predetermined speed for a predetermined period. The signal control module 504 may also control the traffic signal to decrease a period that vehicles are permitted to drive through the intersection in another direction. While examples of controlling signaling have been provided, the signal control module 504 may determine or adjust the timing of one or more traffic signals based on one or more of the vehicle speeds for one or more other reasons.

While example uses of vehicle speed estimated by the speed estimation module 108 have been provided, the present application is also applicable to other uses of one or more of the vehicle speeds.

Figure 6A:
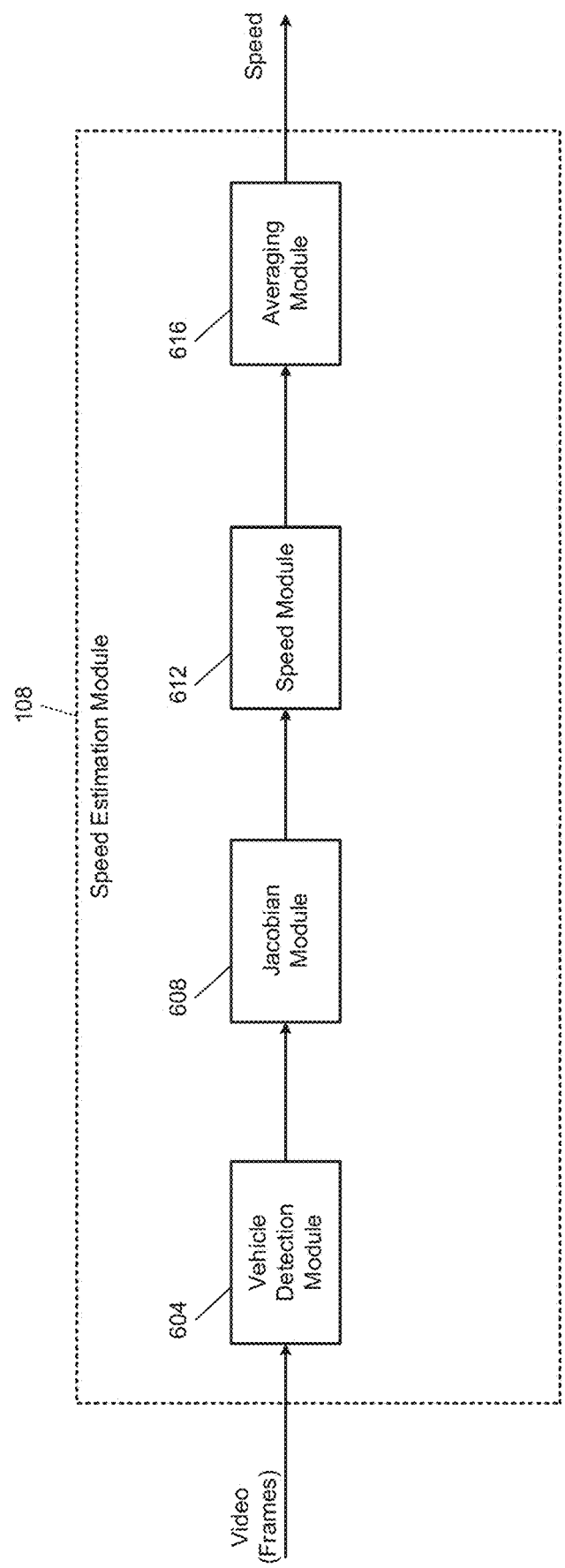
FIGS. 6A-6B are functional block diagrams of example implementations of a speed estimation module.
Figure 6B:
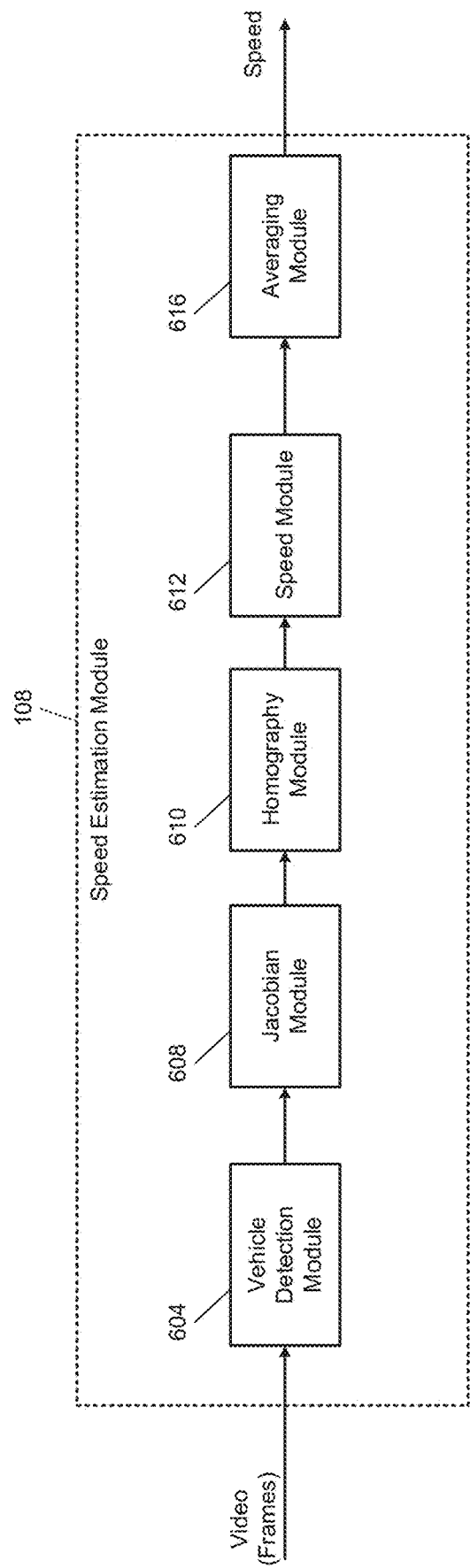

FIGS. 6A-6B are functional block diagrams of example implementations of the speed estimation module 108. A vehicle detection module 604 (or more generally an object detection module) detects and determines bounding boxes of one or more vehicles in each frame of the video, which in one embodiment is received from a camera 104. The vehicle detection module 604 may detect vehicles, for example, using the Mask-RCNN (mask rich convolutional neural network) or another suitable vehicle detection algorithm. The vehicle detection module 604 may track each vehicle from frame to frame to create tracks for the vehicles, respectively. The track for a vehicle includes a time series of bounding boxes (or coordinates of the bounding boxes) for that vehicle. The vehicle detection module 604 may track the vehicles, for example, using the simple online and realtime (SORT) algorithm or another suitable tracking algorithm.

In the example of FIG. 6A, a Jacobian module 608 regresses Jacobians from the bounding boxes, respectively. The Jacobian module 608 includes a neural network trained to regress the Jacobians from a set of bounding boxes used to aggregate information over different observations. The neural network is trained by minimizing an energy function that minimizes the distance between bounding boxes. Jacobians provide a local displacement, but may not provide real world location information.

A speed module 612 determines a speed of a vehicle based on a Jacobian determined based on the bounding box of a vehicle and the bounding box (e.g., the pixel position of the bounding box) using one of an equation and a lookup table that relates Jacobians and pixel positions to speed.

In the example of FIG. 6B, the Jacobian module 608 outputs a set of Jacobians over an interval (period) based on a set of bounding boxes of a vehicle in images over the interval. A homography module 610 determines a homography based on the set of Jacobians over the interval, such as using a RANSAC procedure. In this example, the speed module 612 determines the speed of a vehicle at a time during the interval using the homography. The homography provides real world coordinates of the vehicle that can be used to determined speed, such as a change in real world coordinates over a period. The use of the homography may be more robust than using a single Jacobian as all Jacobians over an interval are used to determine the homography. Additionally, noisy and outlying Jacobians can be removed from the determination of the homography.

To summarize, the speed estimation module 108 involves a three stage pipeline of detecting and tracking each vehicle and then estimating its speed. More specifically, the speed estimation module 108 performs (1) vehicle detection, (2) vehicle tracking and (3) vehicle speed determination using (a) a Jacobian or (b) a homography.

Vehicle speed is estimated using a deep network trained specifically for vehicle speed estimation without making any assumptions as to the planarity or straightness of the road. No dedicated vehicle speed sensors are used in the vehicle speed estimation.

In an embodiment, vehicle detection is accomplished by vehicle detection module 604 using an object detector (object detection algorithm) based on a deep network, such as the Faster-regions with convolutional neural network (Faster-RCNN) object detection algorithm, to determine pixel coordinates for a vehicle. Additional information regarding Faster-RCNN can be found in "*Faster R-CNN: Towards Real-Time Object Detection with Regional proposal Networks*", by Shaoqing Ren, et al., IEEE Transactions on Pattern Analysis and Machine Intelligence, 39(6): 1137-1149, June 2017, which is incorporated herein in its entirety.

The tracking may involve connecting the temporal vehicle detections (e.g., 2D bounding boxes) over time to form vehicle tracks. The tracker can either be heuristic (e.g., including a Kalman filter) or trained.

The vehicle speed estimation includes converting each track (e.g., the pixel coordinates of a vehicle over time or the bounding boxes) to displacements (e.g., meters) in a coordinate system aligned onto the road. This may involve using a Jacobian or the homography. Once the homography has been determined, vehicle tracks can be projected into real world coordinates for vehicle speed estimation.

The speed estimation module 108 determines the vehicle speeds using the Jacobians or the homography, as discussed above. This is similar to but different than calibrating the camera. The speed estimation module 108 determines the vehicle speeds further based on camera parameters. Accurately training the Jacobian module 608, the homography module 610, and the camera parameters provides accurate vehicle speed estimates.

Camera parameters include intrinsic parameters that describe the camera optics (e.g., the principal point, the focal length and distortion coefficients) and extrinsic parameters that describe the position of the camera in the 3D world (e.g., translation and rotation). The concepts discussed herein which are different than camera calibration where calibration parameters are either manually entered by a user or estimated from a frame. The manual entry may include a user annotating multiple points on a road with dimensions. The estimation may assume a straight road and rely on detecting vanishing points as an intersection of road markings (e.g., line markings) or on vehicle motion. Once the camera parameters are known, and assuming a planar road, they directly yield the road homography up to an unknown scaling factor. This factor also needs to be estimated accurately, as all estimated speeds will be proportional to it.

Manual annotations may be used to calibrate camera parameters where several distances are accurately measured on the road plane. A fully automatic approach to calibrate camera parameters may include estimating the scene scale by recognizing vehicles along with their 3D pose, retrieving their 3D model, and aligning the 3D model with its bounding box on the CCTV frame. These camera parameter calibration approaches, however, may make assumptions, such as: (1) the camera is fixed; (2) the road is planar; and (3) the road is straight. The systems and methods described herein provide accuracy even for use of pan tilt zoom (PTZ) cameras and does not involve any assumption regarding the road geometry.

The speed module 612 performs pixel coordinates to real world (3D) position and determines speed based on changes in the real world position over time using the Jacobian or the homography. As discussed above, average speeds of vehicles captured using a camera may be estimated, such as monocular camera. First, the speed module 612 may determine an instantaneous speed for each vehicle at each time (frame of video) based on a Jacobian determined for that frame or using the homography. Second, an averaging module 616 averages the instantaneous speeds for all of the vehicles at a given time to determine the average speed at that time.

Consider a given vehicle V defined as a point $v \in \mathbb{R}$ moving on the road in a world 3D (three-dimensional) coordinate system. The vehicle trajectory $T_V$ can be denoted as the sequence of positions successively/consecutively occupied by the vehicle over time:

$$T_V = \{v_t | 0 \leq t \leq T\}$$

where time t varies in the range [0, T]. The average speed of the vehicle ($S_V$) can be defined as the length of the vehicle's trajectory between two times divided by the period between the two times and can be expressed by the equation:

$$S_v = \frac{1}{T} \int_0^T \|dv\|$$

where dv denotes the infinitesimal displacement of the vehicle and $\|dv\|$ denotes its Euclidean norm—the length of the displacement. The true 3D position of the vehicle v may be unknown, so the 2D (two-dimensional) projection of the vehicle v on the camera plane (pixel coordinates) is used. More specifically, the 2D track is used where the 2D track is defined as $$P_V = \{p_0, \ldots, p_t, \ldots p_T\},$$

where t corresponds to the image/frame between time 0 and time T, and $p_t$ includes the 2D x and y pixel coordinates of the vehicle at time t, $(x_t, y_t)$.

Let F: $\mathbb{R}^2 \rightarrow \mathbb{R}^3$ denote a mapping between pixel coordinates and real world coordinates such that F(p)=v, where F is the homography. The mapping is one-to-one, as the road usually cannot occlude itself. The speed of the vehicle can be expressed as:

$$S_v = \frac{1}{T} \int_0^T \|dFp\|.$$

The homography F: $\mathbb{R}^2 \rightarrow \mathbb{R}^3$ denotes the mapping between image pixels and the 3D world coordinates. The homography module 610 is trained to determine the homography based on detected bounding box (e.g., one homography per bounding box). The speed module 612 determines the instantaneous speed of a vehicle based on or as a sum of small per-frame displacements:

$$S_v = \frac{1}{T}\int_0^T \|dFp\|$$

$$S_v = \frac{1}{T}\sum_{t=0}^{t=T}\|F(p_{t+1}) - F(p_t)\|$$

The mapping function F(p) (the homography) depends on the 3D geometry of the road manifold and on the camera parameters. The mapping function F is continuous and differentiable everywhere on the road.

Figure 7:
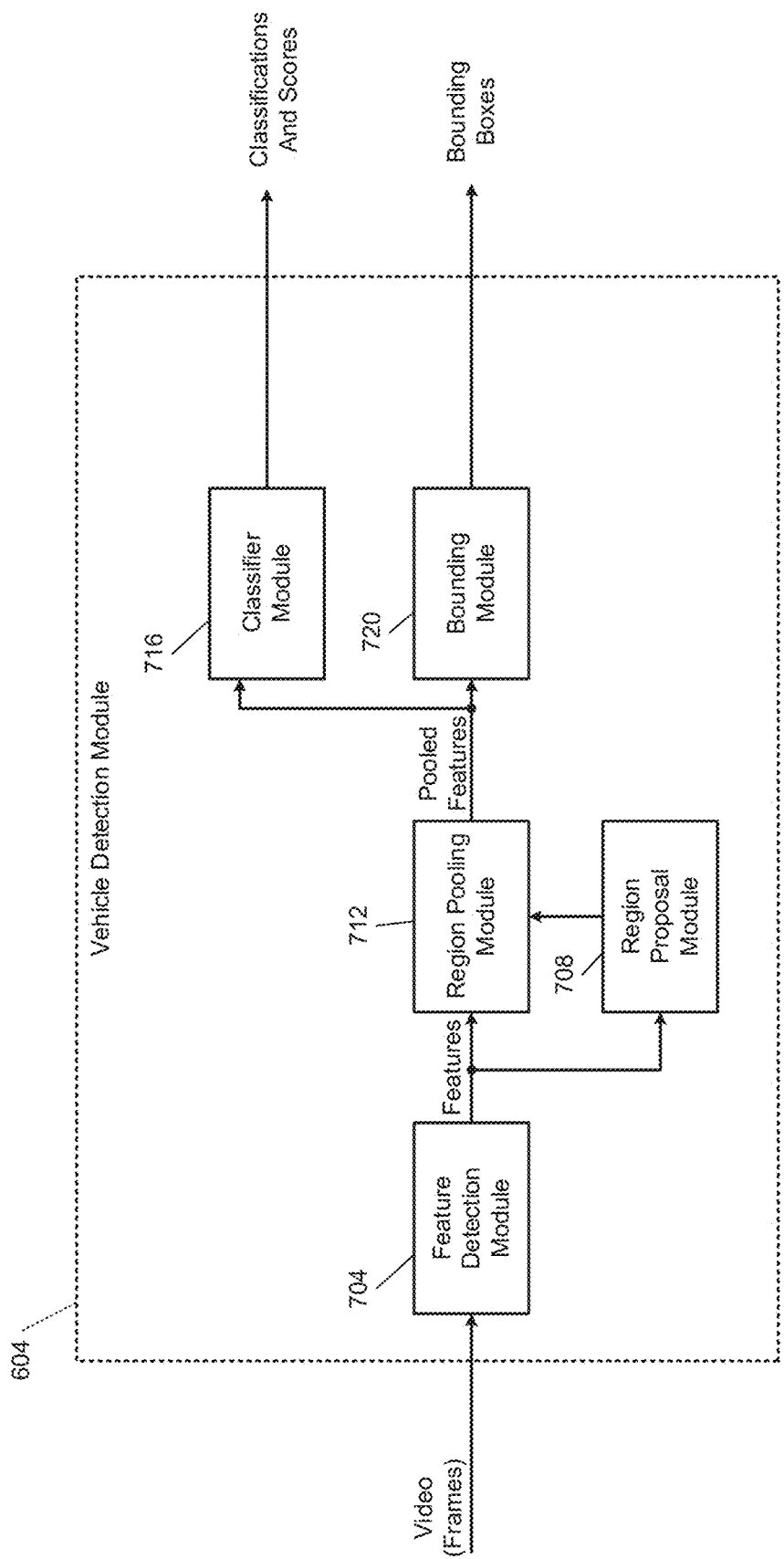
FIG. 7 includes a functional block diagram of an example vehicle detection system that may be utilized by the example speed estimation system shown in FIG. 6A-6B.

FIG. 7 includes a functional block diagram of an example vehicle detection module 604 that may be utilized by the speed estimation module 108 shown in FIGS. 6A and 6B. A feature detection module 704 receives a video produced, for example, by a camera. The feature detection module 704 identifies features in a frame/image of the video at a time using a feature detection algorithm.

A region proposal module 708 proposes regions of interest in the frame based on the features using a region proposal algorithm. A region pooling module 712 pools features based on the proposed regions to produce pooled features.

A classifier module 716 classifies objects formed by the pooled features using an object classification algorithm. One possible classification of objects includes vehicles. The classifier module 716 may also determine scores for each classified object, where the score of an object indicates a relative confidence of the classification determined for the object. Objects having one or more predetermined classifications (e.g., vehicles) and confidence levels greater than a predetermined value may be subject to speed estimation.

A bounding module 720 determines 2D bounding boxes that bound outer edges of the objects identified. The bounding module 720 may also determine coordinates (p) of the objects, such as coordinates of centers of the bounding boxes. The bounding module 720 may determine a Jacobian for each bounding box.

In various implementations, the vehicle detection module 604 may include a Faster-RCNN that is applied to each video frame to obtain a set of vehicle detections and associated bounding boxes. The Faster-RCNN is a deep neural network that includes a ResNet-50 backbone (in the feature detection module 704) followed by one or more region proposal layers (in the region pooling module 712 and region proposal module 708, for example). For pooled features of each video frame output by the region pooling module 712, a region proposal (i.e., a 2D bounding box in the image) is output by the bounding module 720 and a classification (e.g., car, truck, bus, motorcycle) and a confidence score is output by the classifier module 716. Region proposals with low confidence scores are discarded by the vehicle detection module 604. Objects not having a predetermined classification (e.g., vehicles) may also be discarded.

Figure 8:
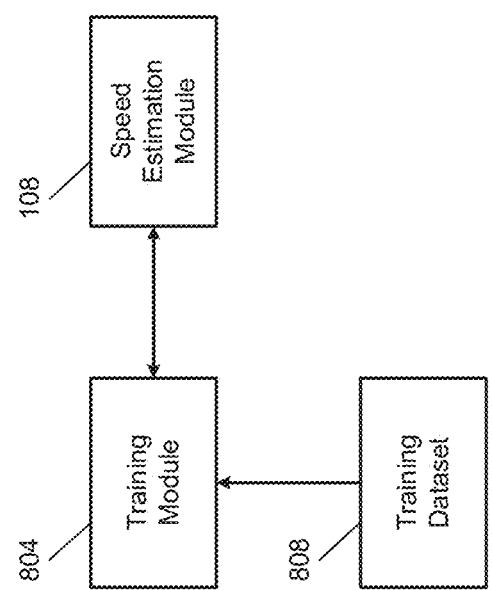
FIG. 8 includes a functional block diagram of an example training system.

FIG. 8 is a functional block diagram of an example training system. A training module 804 trains the homography module 610 using a training dataset 808 in a supervised manner. The training dataset 808 may include videos including vehicles on roads with annotated bounding boxes around the vehicles and associated homographies. Specifically, the training module 804 learns/trains the camera parameters and the homography. The training module 804 inputs data from the training dataset 808, receives tracks from the tracking module 608 or detections from the vehicle detection module 604, smoothes and denoises the tracks or the detections as discussed further below. The training module 804 trains the camera parameters, the Jacobian module 608, and the homography module 610 by minimizing an energy function with the smoothed and de-noised outputs as inputs. More specifically, the training module 804 trains the Jacobian module 608 and the homography module 610 to minimize a loss determined based on differences between known parameters (e.g., Jacobians or homographies) stored in the training dataset 808 for given bounding boxes and Jacobians or homographies estimated by the Jacobian module 608 or the homography module 610 based on the given bounding boxes.

In the following, scalar variables are written in lowercase, and vectors or matrices are written in uppercase. Function names like E or h are written in bold. Sets like M, V, and D are written in italics.

The training module 804 trains the speed module 612 to minimize a function $E:M \times V \to \mathbb{R}$ that measures the fit, or plausibility, between a hypothetical calibration $h \in M$ and a set of vehicle detections $D \in V$. The training can be formulated as:

$$h^* = \mathrm{argmin}_{h \in M} E(h, D) \qquad (1)$$

In the following, possible embodiments of the space M of possible camera calibrations are described. The energy function E is also described and extended to multiple vehicle models (types). Multiple minimization strategies are described to determine the outcome of equation (1) above. De-noising the set of vehicle detections to improve robustness are also discussed.

Extended calibration may mean the set of all parameters that enable a 3D reconstruction of the road, including all intrinsic camera parameters, extrinsic parameters (camera absolute position and rotation), and the geometry of the road itself. In other words, and without loss of generality, the extended calibration h E M may be defined as a differentiable smooth function that maps real-world coordinates of road points to their corresponding pixel positions in the image.

In detail, this can be expressed by $h: X \in \chi \to P \in \chi$ where $\chi = \mathbb{R}^3$ is the real world (e.g., metric) coordinate system and $I = \{1, \ldots, I_W\} \times \{1, \ldots, I_H\}$ is the set of image pixels, W being the width of the image in pixels, and H being the height of the image in pixels. The Jacobian of h at a position $X = (x, y, z)$ can be defined as:

$$J_h(X) = \begin{bmatrix} \frac{\partial i}{\partial x} & \frac{\partial i}{\partial y} & \frac{\partial i}{\partial z} \\ \frac{\partial j}{\partial x} & \frac{\partial j}{\partial y} & \frac{\partial j}{\partial z} \end{bmatrix},$$

with $$h(X) = P = (j, i).$$

The Jacobian module 608 may determine the Jacobians in this manner.

h can take several forms, depending on a target level of approximation between model and reality. For example, the road geometry could be implemented using 2D splines or a planar road model. h amounts to a homography:

$$h(\overline{X}) = \left( \frac{H_1 \overline{X}}{H_3 \overline{X}}, \frac{H_2 \overline{X}}{H_3 \overline{X}} \right)$$

where $H \in \mathbb{R}^3$ is the homography matrix ($H_i$ denotes the i-th row) and $\overline{X}=(x,y,1)$ maps a point to the road plane. H may be decomposed as a rigid motion (rotation R and translation T forming $[R|T] \in SE(3)$ followed by a projection on the image plane:

$$H = K \times [R|T] \times \begin{bmatrix} 1 & 0 & 0 & 0 \\ 0 & 1 & 0 & 0 \\ 0 & 0 & 0 & 0 \\ 0 & 0 & 0 & 1 \end{bmatrix} \quad (2)$$

where $K \in \mathbb{R}^{3 \times 3}$ is the intrinsic calibration matrix and the last matrix forcefully projects the homogeneous point $X=(x,y,z,1)$ to the plane z=1 as $\overline{X}=(x,y,1)$. $d=R_3^T T$ is the distance between the camera and the road plane.

Homographies can have 8 degrees-of-freedom (DOF). However, the homography discussed herein can have only 3 free parameters (3 DOF) based on the identification that vehicle speeds, length measures over time in the 2D road plane, are invariant to translations and rotations. In other words, H can be right-multiplied by a rotation $R^z$ around the z-axis and T can be set arbitrarily, as long as the camera to ground distance $d=R_3^T T$ for instance fixing $T=dR_3$. Assuming a horizontal horizon, rotation on the y-axis can also be eliminated. The inverse mapping H can be generated from equation (2) as $$H = \begin{bmatrix} f & & c_i \\ & f & c_j \\ & & 1 \end{bmatrix} \times [R^x | dR_3^x] \times \begin{bmatrix} 1 & 0 & 0 & 0 \\ 0 & 1 & 0 & 0 \\ 0 & 0 & 0 & 0 \\ 0 & 0 & 0 & 1 \end{bmatrix} \quad (3)$$

$$H = K \times R^x \times \begin{bmatrix} 1 & 0 & 0 \\ 0 & 1 & 0 \\ 0 & 0 & d \end{bmatrix}$$

$$H = K \times R \times D \quad (4)$$

where f is the camera's focal length, $$(c_i, c_j) = \left(\frac{I_W}{2}, \frac{I_H}{2}\right)$$

is the principal point assumed to be at the image center for simplicity, and RX is a rotation around the x-axis. Camera roll (non-horizontal horizon) introduces another free parameter (another DOF) corresponding to a rotation on the y-axis.

All parameters (focal f, rotations R, and camera height d) can conversely be recovered from the homography H. The focal f can be recovered by satisfying the orthogonality constraint between two main vanishing points:

$$f = \sqrt{-V_1^T V_2} \text{ where}$$

$$V_i = \left(\frac{H_{1,i}}{H_{3,i}}, \frac{H_{2,i}}{H_{3,i}}\right)$$

This yields the intrinsics calibration matrix K.

The rotation matrix R can be defined as $$R=[\overline{V}_1, \overline{V}_2, \overline{V}_3] \text{ with } \overline{V}_3 = \overline{V}_1 \times \overline{V}_2, \text{ and } \overline{V}_i = (V_{i,1}, V_{i,2}, f).$$

The translation matrix D can be obtained using $$D=(KR)^{-1}H$$

which according to equation (3) yields the camera height $d=D_{2,2}$.

Given a camera calibration space M, the training module 804 evaluates the quality of a given calibration $h \in M$ given a set of detected vehicle tracks $D \in V$ from the training dataset 808.

$D = \{\mathcal{T}_j\}_{j=1}^{|D|}$ as a set of IDI vehicle tracks from the training dataset 808 where each track $\mathcal{T}_j = \{(B_{j,i}, t_{j,i})\}_{i=1,\ldots,|\mathcal{T}_j|}$ is a sequence of 2D car bounding boxes $B_{j,i} \in \mathbb{R}^4$ and their corresponding time-stamps $t_{j,i} \in \mathbb{R}$ detected and tracked beforehand. In other words, the training dataset 808 includes annotated and time stamped bounding boxes forming tracks. The annotations may include, for example, the respective Jacobians and/or the homography. The size of the bounding boxes may be approximately equal to what the 3D calibration model h would predict knowing the real 3D car's positions and dimensions.

In other words, the energy E(h,D) includes of a re-projection error between the true bounding boxes and hypothetical ones fitted using h:

$$E(h,D) = \sum_{j=1}^{|D|} \sum_{i=1}^{|\mathcal{T}_j|} \ell(B_{j,i}, f_h(B_{j,i})) \quad (5)$$

where $\ell$ is an error function and $f_h(B_{j,i})$ is the fitted bounding box, computed as follows. The fitted bounding boxes may be alternately annotated as B' below. The training module 804 may train the Jacobian module 608 or both the Jacobian module 608 and the homography module 610 to minimize the error function.

The vehicle's geometry may be denoted as an array of 3D points $A \in \mathbb{R}^{3 \times N}$ bottom-centered at 0 and aligned with the three main axes (i.e., length, width and depth respectively aligned with x-, y- and z-axes), and a rotation $R_{j,i}$ and translation $T_{j,i}$ that transport the vehicle on the road and orientate it properly, the bounding $f_h(B_{j,i})$ can be computed as $$f_h(B_{j,i}) = (\min_n A'_{n,1}, \min_n A'_{n,2}, \max_n A'_{n,1}, \max_n A'_{n,2}) \quad (6)$$

with $$A' = h(R_{j,i}A + T_{j,i})$$

The car geometry A can be assumed to be the same as most cars have similar shapes. The training module 804 fits the predicted bounding boxes by calculating $R_{j,i}$ and $T_{j,i}$ knowing the true bounding box For the rotation $R_{j,i}$, vehicle motion direction in the image and in the real-world road are related by the Jacobian. More specifically, $\mu(B_{j,i})$ denote the center of the bounding box. The apparent motion $M_{j,i} \in \mathbb{R}^2$ of the vehicle in the image can be expressed as $$M_{j,i} = \frac{\partial \mu}{\partial t}(B_{j,i}) \quad (7)$$

The inverse mapping (pixel-to-road) may be denoted by $g: P \in I \to X \in X$ and its homography matrix can be denoted as $g = h^{-1}$ and $G = H^{-1}$, respectively.

The Jacobian of g yields an accurate first order approximation of the motion $Q_{j,i} \in \mathbb{R}^3$ in the real-world:

$$Q_{j,i} \approx J_g(\mu(B_{j,i})) M_{j,i}$$

The Jacobian module 608 may determine Jacobians in this manner.

The vehicle's principal (e.g., longitudinal) axis may then be aligned with $Q_{j,i}$. The car vertical axis may be perpendicular to the road manifold at $g(\mu(B_{j,i}))$ a direction which can be obtained by taking the cross-product of $J_g(\mu(B_{j,i}))$. Then, $$R_{j,i} = [\overline{Q}_1, \overline{Q}_3 \times \overline{Q}_1, \overline{Q}_3] \in \mathbb{R}^{3 \times 3}$$

where $$\overline{Q}_1 = \frac{Q_{j,i}}{\|Q_{j,i}\|},$$

$$\overline{Q}_3 = \frac{J_1 \times J_2}{\|J_1 \times J_2\|}, \text{ and}$$

$$J_g(\mu(B_{j,i})) = [J_1, J_2] \in \mathbb{R}^{3 \times 2}.$$

Note that this procedure is valid while the inverse mapping g operates in a plane parallel and a little above the road, such as at half-vehicle's height, i.e., where the vehicle center $\mu(B_{j,i})$ actually lies. As a consequence, $g'=(h \circ t)^{-1}$ may be used in the previous formulas in place of g, where $$t(x, y, z) = \left(x, y, z + \frac{A_H}{2}\right)$$

is a vertical translation by half of the height of the vehicle $A_H = \max_n A_{n,3}$. This can be written as:

$$G' = \left(K \times R \times \begin{bmatrix} 1 & 0 & 0 \\ 0 & 1 & 0 \\ 0 & 0 & d - \frac{A_H}{2} \end{bmatrix}\right)^{-1}$$

For the translation $T_{j,i}$, an iterative fixed-point scheme may be used. As an initial estimate, the training module 804 may project $\mu(B_{j,i})$ onto the road manifold $T_{j,i}^0 = g'(\mu(B_{j,i}))$. Due to the perspective effect, however, the resulting vehicle may not be well centered in the target bounding box $B_{j,i}$. The training module 804 may therefore correct or re-center the position by iteratively updating $T_{j,i}^k$, k=0, ... K as follows.

Based on $T_{j,i}^k$ the training module 804 determines a predicted bounding box $$f_h^k(B_{j,i}) = h(R_{j,iA} + T_{j,i}^k)$$

and its center $$\mu(f_h^k(B_{j,i})).$$

The training module 804 next updates the translation based on the difference between the expected and predicted positions of the bounding box $$T_{j,i}^{k+1} = T_{j,i}^k + T_{j,i}^0 - g'(\mu(f_h^k(B_{j,i}))).$$

Convergence may occur quickly and K=3 iterations may be sufficient to align the predicted bounding box with $B_{j,i}$.

The error function $\ell$ used by training module 804 ($\ell(B,B')$) compares the two bounding boxes B=(left, top, right bottom) boundaries, with B being the reference (observed) bounding box, and B' being the predicted bounding box. While the example of rectangular bounding boxes is provided, coordinates of polygons may be used. The bounding boxes may be masked or unmasked vehicles. Bounding boxes may be defined rectangularly by the top, right, left, and bottom most points of the vehicle.

FIG. 9 includes example bounding boxes and polygons. (c), (d), and (e) illustrate example rectangular bounding boxes. (b), (c), (d), and (e) illustrate example polygon bounding boxes. (d) and (e) illustrated masked vehicles, while (a), (b), and (c) illustrate unmasked vehicles. (a) is an example illustration of a vehicle. (b) illustrates that the training module 804 may use a simplified version of the vehicle represented by the red vertices. (c) illustrates that the training module 804 may determine a 2D convex hull of the rendered point set of (b), such as using Graham's algorithm. Graham's algorithm is described in R. L. Graham, *An Efficient Algorithm for Determining the Convex Hull of a Finite Planar Set*, Information Processing Letters, 1(4):132-133, June 1972, which is incorporated herein in its entirety. (d) illustrates a resulting polygon, and (e) illustrates the resulting polygon is re-scaled to fit a square of dimensions $M_s \times M_s$. (f) illustrates that the training module 804 may convert the polygon into a bitmap mask $$M \in [0, 1]^{M_s \times M_S}.$$

In the example of unmasked bounding boxes, the training module 804 may determine the error function $\ell$ using L1 distance, which can be defined by:

$$\ell_{L1}(B,B') = \Sigma_{n=1}^4 \min(|B_n - B'_n|, \text{whwh}(B)_n),$$

with a capping set of $$\text{whwh}(c) = [\text{width}(c), \text{height}(c), \text{width}(c), \text{height}(c)]$$

In various implementations, the training module 804 may determine the error function $\ell$ using a normalized L1 distance, which can be defined by:

$$\ell_{L1-N}(B, B') = \Sigma_{n=1}^4 \min\left(\frac{|B_n - B'_n|}{\text{whwh}(B)_n}, 1\right).$$

In various implementations, the training module 804 may determine the error function $\ell$ using an intersection over union, which can be defined by:

$$\ell_{IoU}(B, B') = \frac{\text{intersection}(B, B')}{\text{union}(B, B')}$$

with $$\text{union}(B, B') = \text{area}(B) + \text{area}(B') - \text{Intersection}(B, B')$$

In various implementations, the training module 804 may determine the error function $\ell$ using a scaled intersection over union, which can be defined by:

$$\ell_{IoU-SC}(B,B') = \sqrt{\text{area}(c)} \, \ell_{IoU}(B,B')$$

Here, the rationale is that perspective effects are more pronounced for objects closer to the camera. Because perspective effects may be important to precisely estimating the focal, the error may be up-weighted on those closer (hence larger) vehicles.

In various implementations, in the example of masked vehicles, the training module 804 may determine the error function $\ell$ using a masked intersection over union, which can be defined by:

$$\ell_{IoU-Msk}(M, M') = \frac{\text{intersection}(M, M')}{\text{union}(M, M')}.$$

In this example, masks are used in place of bounding boxes. A mask $$M \in [0, 1]^{M_s \times M_s}$$

is a fixed size map that indicates the likelihood of the vehicle presence at each location on the Ms×Ms grid matched to the bounding box B. The training module 804 may receive the masks directly from the vehicle detection module 604 (e.g., in addition to the bounding box, label, and class score), such as using a Mask-RCNN. An example Mask-RCNN is described in Kaiming He, et al., *Mask R-CNN*, arXiv: 1703.06870[cs], January 2018, arXiv:1703:06870. Alternatively, the training module 804 may determine the masks, such as using a background subtraction algorithm. An example background subtraction algorithm is described in Jakub Sochor, et al., *Traffic Surveillance Camera Calibration by 3D Model Bounding Box Alignment for Accurate Vehicle Speed Measurement*, Computer Vision and Image Understanding, 161:87-98, August 2017, arXiv:1702.06451. For the example of a predicted bounding box, the training module 804 may determine the mask based on a 3D model point cloud A from equation (6) above. The training module 804 may first determine a 2D convex hull of the projected point cloud A' and determine the mask M' as a filled polygon. IoU (intersection over union) may be carried out on masks as pixel wise minimum and pixel wise maximum operations, respectively.

Different types of vehicles, (e.g., sedan, SUV, truck, etc.) have relatively different shapes and dimensions. The training dataset 808 may include models of different types of vehicles, each model including an array of 3D points. Equation (5) above may be modified to identify the optimal type of vehicle for each vehicle track:

$$E(h, D) = \sum_{j=1}^{|D|} \min_{A \in A} L_A(h, T_j) \quad (8)$$

with $$L_A = \sum_{i=1}^{|T_j|} \ell(B_{j,i} f_{h,A}(B_{j,i}))$$

The training module 804 may determine the error for each different type of vehicle (model) and use the smallest error.

A by-product of the energy function is that the speed module 612 can determine vehicle speeds based on the 3D placements of detected vehicles defined by their rotations $\{R_{j,i}\}$ and translations $\{T_{j,i}\}$. Based on the rotations and translations, the speed module 612 can determine the vehicle speed using the equation:

$$\text{speed}_j(i) = \frac{\partial T_{j,i}}{\partial t_{j,i}} \cong \frac{\|T_{j,i+1} - T_{j,i-1}\|}{t_{j,i+1} - t_{j,i-1}}$$

Regarding minimization, the energy function defined in equation 8 may be complex and not convex, as the loss function itself (whichever example used) is not convex. Therefore, the energy function may include multiple local minima. The training module 804, however, finds the global minimum (see equation (1)).

In an example, the training module 804 may minimize the energy function using random searching. Random searching involves the training module 804 randomly sampling parameters are sequentially from predetermined ranges. The following table is an example of ranges.

TABLE 1

| Parameter | unit | min | max |
| --- | --- | --- | --- |
| focal f | pixels | $I_W/5$ | $10 I_W$ |
| Camera height f | meters | 2 | 100 |
| Tilt $R_x$ | radian | 0 | $\pi/2$ |
| Roll $R^y$ (opt) | radian | −0.1 | 0.1 |

The training module 804 evaluates the resulting camera calibration from each sample, and the best result (e.g., minimum cost) is returned after NT trials.

In an example, the training module 804 may minimize the energy function using narrowing grid searching. Narrowing grid searching involves the training module 804 dividing the search space in a hyper-grid of side $N_G$ and dimension D=3 or 4, depending on the number of considered parameters. Predetermined ranges of each parameter is defined in Table 1 above.

The training module 804 may evaluate the energy function at each of the $N_G^D$ hyper-grid nodes. The training module 804 identifies the one of the nodes h*=argmin $n_{h \in \varrho}$ E(h,D). The training module 804 may then reduce each parameter's range (e.g., by half), centering the new grid on the one node previously identified. This may be continued to the extent that the predetermined range from Table 1 allows. The halving process is repeated $N_H$ times, resulting in overall $N_H N_G^D$ operations.

In an example, the training module 804 may minimize the energy function using hyper-parameter optimization. Hyper-parameter optimization may include the training module 804 randomly sampling parameters sequentially. For each sampling, the training module 804 may evaluate the value of the energy, and the result is used to update a probabilistic model for drawing the next random sample. The training module 804 aims to draw samples from a distribution P(y|x) that models the loss y=E(h$_x$,D) for a particular parameter assignment x.

The training module 804 may approximate the distribution using a tree-based parzen estimator. An example tree-based parzen estimator is described in James S Gergstra, et al., *Algorithms for Hyper-Parameter Optimization*, NeurIPS, page 9, 2011, which is incorporated herein in its entirety. The only parameter for this approach is the number of samples Ns (trials) that are drawn overall.

In an example, the training module 804 may minimize the energy function using gradient-based optimization, Power-Mead, Nelder-Mead, gradient descent, conjugate gradient, BFGS, or another suitable form of gradient-based optimization.

In various implementations, the vehicle detection module 604 may smooth detections. The energy function (equation 8) may be based on a hypothesis that vehicles are correctly detected and their bounding boxes are precisely estimated. However, noise may occur and may occur at multiple levels, such as during the image acquisition process (e.g., imperfect camera lens, compression artifacts, weather conditions), during detection (e.g., false negatives, false positives, erroneous box boundaries), and during vehicle tracking (e.g., interrupted tracks, erroneous tracking, tracks clipped by one or more image boundaries, tracks occluded by one or more objects, etc.). Noise may also accumulate when computing derived variables such as the motion of a vehicle from equation (7). The homography module 610 may therefore denoise the input detections before they are used to determine the homography. In other words, noisy Jacobians may be removed from the homography determination.

In various implementations, a vehicle track $T=\{(B_i,t_i)\}_{i=1,\ldots,|T|}$ (dropping the subscript j for clarity) may be used to produce a smoothed vehicle track $T'=\{(B'_i,t_i)\}_{i=1,\ldots,|T|}$ with updated bounding boxes B'. The received track may include outliers (e.g., false positives or true detections from a different neighboring track), so that direct smoothing (e.g., with B-splines) may fail. The time stamps may not be regularly spaced in addition, such as due to missed detections or occlusions.

In an example, the vehicle detection module 604 may smooth the tracks using a first smoothing. The first smoothing may include 2 steps: (1) separating inliers and outliers using an energy minimization method and (2) further smoothing the inliers using B-splines.

Regarding the energy minimization, the training module 804 may minimize the energy function using a quadratic smoothness term and a $\ell$ 1-norm fitting term:

$$E_S = \frac{1}{2}\Sigma_{i=2}^{N-1}(B'_i - \mu'_i)^2 + \lambda\Sigma_{i=1}^{N}|B'_i - B_i|_1,$$

where $$\mu'_i = \frac{(t_{i+1} - t_i)B'_{i-1} + (t_i - t_{i-1})B'_{i+1}}{t_{i+1} - t_{i-1}}$$

is the linearly interpolated mean of $B'_{i+1}$ and $B'_{i-1}$. The quadratic term enforces a smooth trajectory while the fitting term ensures that the trajectory does not deviate too much from the observations. The hyper-parameter λ allows to tune the trade-off between both terms.

To minimize the energy function, the training module 804 may use an iterative Lasso solver that performs gradient steps with soft thresholding. An example Lasso solver is described in Robert Tibshirani, *Regression Shrinkage and Selection via the Lasso*, Journal of the Royal Statistical Society, Series B (Methodological), 58(1):267-288, 1996, which is incorporated herein in its entirety.

Regarding B-spline interpolation, the homography module 610 may determine the inlier detections as satisfying the following distance test to the observations:

$$|B-B'|<\tau.$$

The homography module 610 may then perform a B-spline interpolation of the inlier series with a maximum deviation tolerance also set to τ yielding the smoothed track T".

In another example, the homography module 610 may smooth the tracks (e.g., Jacobians) using a second (specialized) smoothing. The first smoothing tracks the input tracks as any series of 4D points. The tracks are generated by rigid objects (vehicles) moving in a 3D world. The second smoothing may insert prior knowledge so that tracks are more consistent with the underlying physical process.

In the second smoothing, (1) observed boxes are cropped at the image boundaries due to the detector. Hence, some observations (near image boundaries) may be unreliable. In the second smoothing, (2) the height h of the bounding box is dependent of the vehicle's coordinate in the scene. Specifically, the following relationship applies:

$$(1+ky)h=k'$$

where k and k' are constant values. There is a linear relationship between the inverse height 1/h and y. In the second smoothing, (3) the aspect-ratio is not supposed to change as long as the vehicle does not turn. This may hold only under affine viewing conditions, hence it may be false in general. However, perspective effects may be small and this principle is reliable to some extent.

Energy minimization may be modified for the second smoothing to integrate the above-mentioned constraints. To integrate the first constraint, a mask of valid coordinates $v(B)\in\{0,1\}^4$ may be used in the fitting term with ρ a margin in pixels:

$$v(B)=(I[B_0>\rho],I[B_1>\rho],I[B_2<W-\rho],I[B_3<H-\rho])$$

where each I[•] is the indicator function and $$E_S=1/2\Sigma_{i=2}^{N-1}(B'_i-\mu'_i)^2+\lambda\Sigma_{i=1}^{N}|v(B_i)(B'_i-B_i)|_1,$$

The above energy function may be used for bounding boxes that are clipped, such as by the boundary of an image and/or by one or more objects located in a line of sight between the vehicle and the camera.

In between each iteration of the Lasso minimization, the training module 804 may enforce the two other constraints. The training module 804 may first estimate the vehicle's height using least-square linear fitting from the y coordinate:

$$\frac{1}{h_i} = \alpha y_i + \beta \text{ with } y_i = \frac{B'_{i,2} + B'_{i,4}}{2} \text{ and } h_i = B'_{i,4} - B'_{i,2} \text{ and}$$

$$\alpha, \beta = \operatorname{argmin}_{\alpha,\beta}\sum_{i=1}^{N}\left(\alpha y_i + \beta - \frac{1}{h_i}\right)^2$$

Because the aspect ratio $$a_i = \log\left(\frac{w_i}{h_i}\right)$$

of a box $B'_i(w_i=B'_{i,3}-B'_{i,1})$ the bounding box width is a function of the motion direction, the vehicle detection module 604 may determine a motion direction $$\overline{M}_i = \frac{M_i}{\|M_i\|}$$

where $M_i$ is defined in equation (7) above.

The vehicle detection module 604 determines an updated aspect ratio as a kernel weighted average of all aspect-ratios with a similar motion direction:

$$a_i = \frac{1}{\sum_{j=1}^{|T|}e^{\kappa\overline{M}_i^T\overline{M}_j}}\sum_{j=1}^{|T|}e^{\kappa\overline{M}_i^T\overline{M}_j}\log\frac{w_i}{h_i}$$

The vehicle detection module 604 updates the smoothed bounding boxes using the equation:

$$B'_i = \left(\mu_{i,1} - e^{\alpha_i}\frac{h_i}{2}, \mu_{i,2} - \frac{h_i}{2}, \mu_{i,1} + e^{\alpha_i}\frac{h_i}{2}, \mu_{i,2} + \frac{h_i}{2}\right)$$

with $$\mu_i = \left(\frac{B'_{i,1} + B'_{i,3}}{2}, \frac{B'_{i,2} + B'_{i,4}}{2}\right).$$

The homography module 610 may perform the inlier detection and B-spline smoothing as discussed above. The second smoothing may extrapolate tracks outside of the image boundaries.

In another example, the homography module 610 may smooth the tracks using a third (straight prior) smoothing. The third smoothing involves vehicle tracks being mostly straight and removes noise from tracks. The third smoothing involves a RANSAC like iterative process. For each iteration, the homography module 610 may randomly select 2 bounding boxes from a track from which a trajectory tube can be inferred. All other bounding boxes of the track are matched against the trajectory tube. The homography module 610 determines an error measure. The homography module 610 determines a hypothesis (the tube with the lowest error) to generate the smoothed bounding boxes.

The RANSAC procedure can be described by a tube $\Gamma_{i,j}$: $t \in \mathbb{R} \rightarrow B' \in \mathbb{R}^4$ generated given two bounding boxes $B_i$ and $B_j$ a with $t_i < t_j$ using linear interpolation:

$$\Gamma_{i,j}(t) = \frac{t - t_i}{t_j - t_i}B'_j + \frac{t_j - t}{t_j - t_i}B'_i = \alpha t + \beta$$

with $\alpha = \dfrac{B'_j - B'_i}{t_j - t_i}$ and $\beta = \dfrac{t_j B'_j - t_i B'_i}{t_j - t_i}$ To fit a bonding box $B_k$ to $\Gamma_{i,j}$, the homography module 610 may use least-square fitting. This may offer a convenient closed-form solution.

$$B_k = \Gamma_{i,j}(t^*) \quad (9)$$

with $$t^* = \operatorname{argmin}_t(v(B_K)(\Gamma_{i,j}(t) - B_k))^2 = \frac{\sum_{n=1}^{4}[\alpha v(B_k)(B_k - \beta)]_n}{\|\alpha v(B_k)\|^2}.$$

Note that the mask $v(c)$ is used here.

IoU ($\ell_{IoU}(B_k, B'_k)$) may be used as described above to score a hypothesis tube as $\Sigma_k \ell_{IoU}(B_k, B'_k)$. Once the best tube is selected (e.g., with the lowest error) by the homography module 610, the output boxes are determined by fitting observed boxes to the tube using equation (9).

As an additional constraint, the homography module 610 may require that the sequence of fitted time $\{t_k^*\}_k$ be monotonously growing to prevent the possibility of the occurrence of the vehicle moving backwards along its tube. The homography module 610 may apply a dynamic time warping algorithm on the sparse point set $\{t^*_k, \ell_{IoU}(B_k, B'_k)\}_k$ to select the monotonous subset, such as the subset with the highest (maximum) score, and perform B-spine smoothing as described above.

Figure 10:
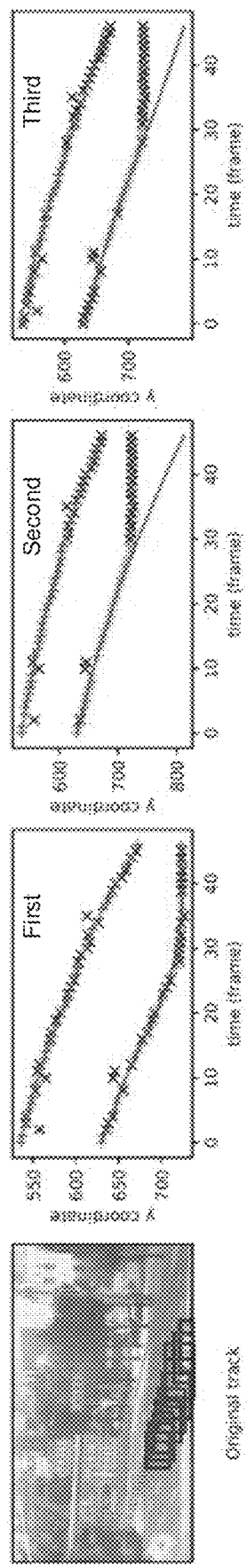
FIG. 10 includes example illustrations of an original track and smoothed tracks generated using different types of smoothing.

FIG. 10 includes example illustrations of an original track and smoothed tracks generated using the first, second, and third smoothings described above. As shown, the original track eventually leaves the bottom of the image frames and the bounding boxes are cropped as the vehicle approaches and reaches the bottom of the images. The lines represent the smoothed output tracks, and only the top and bottom bounding box coordinates are shown in green and red, respectively. Plusses and crosses correspond to input coordinates classifies as inliers and outliers, respectively.

Figure 11:
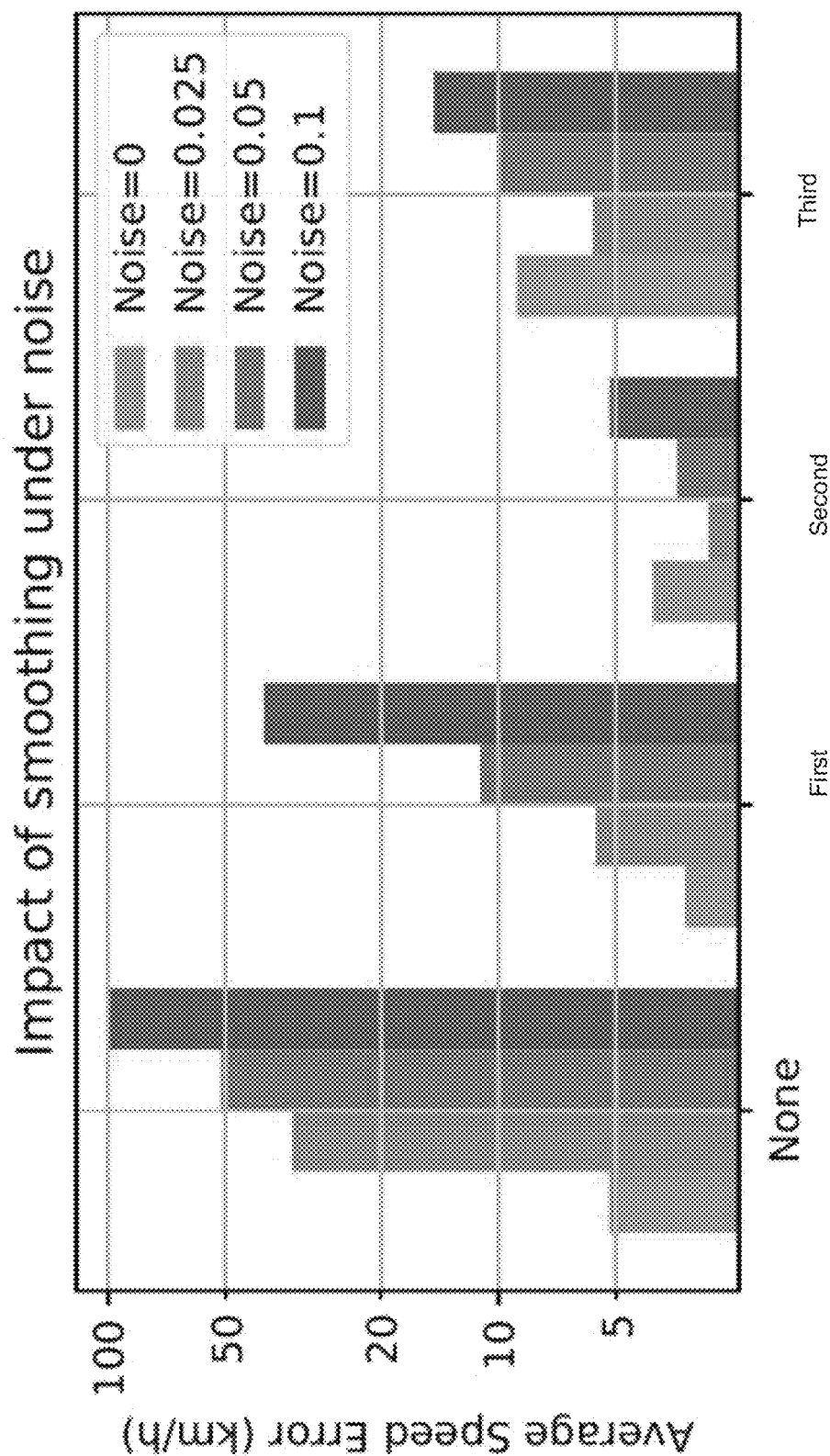
FIG. 11 is an example graph of speed error versus noise for the different types of smoothing.

FIG. 11 is an example graph of speed error versus noise for each of the first, second, and third smoothings discussed above. As illustrated, the second smoothing may provide the least average speed error, but all of the first, second, and third smoothings provide less speed error than no smoothing (none).

The training dataset 808 may be, for example, the Cubic-Car Synthetic dataset, the Synthetic Road dataset, or another suitable synthetic dataset.

Figure 12:
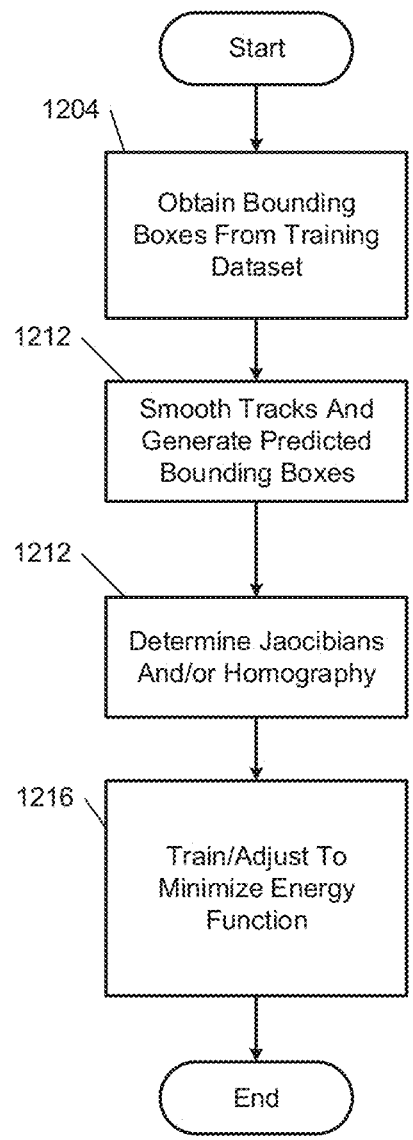
FIG. 12 includes a flowchart depicting an example method of training a homography.

FIG. 12 is a flowchart depicting an example method of training the speed estimation module 108 to estimate speed. Control begins with 1204 where the training module 804 obtains the bounding boxes (and the annotations) from the training dataset 808 and inputs the bounding boxes to the speed estimation module 108.

At 1208, the speed estimation module 108 may generates predicted bounding boxes as described above, such as using one of the first, second, and third smoothings, to smooth the tracks. At 1208, the speed estimation module 108 determines the Jacobians and/or the homography, as described above.

At 1216, the training module 804 updates the speed estimation module 108 (e.g., the Jacobian module 608 and/or the homography module 610), such as one or more parameters of the neural network to minimize the energy function based on the generated Jacobians and/or homography relative to the known Jacobians and/or homography stored in the training dataset 808. 1204-1216 may be performed a predetermined number of times before control ends.

Figure 13A:
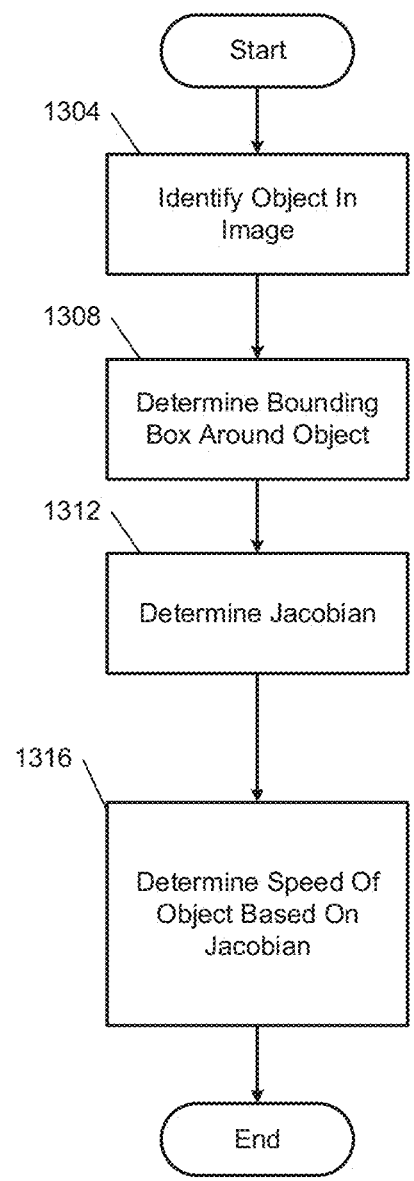
FIGS. 13A-13B include flowcharts depicting example methods of estimating speed.
Figure 13B:
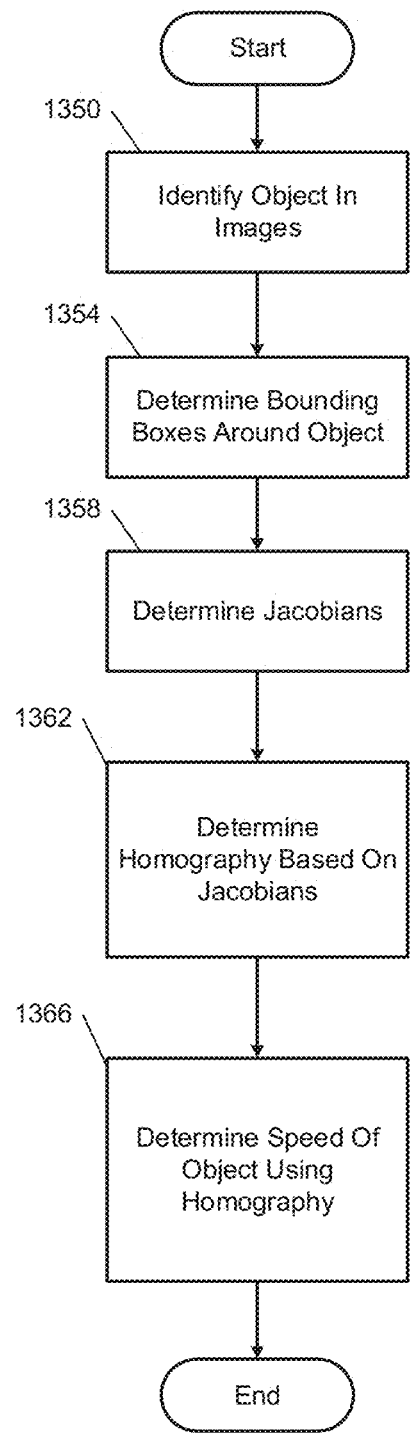

FIGS. 13A-13B are flowcharts depicting example methods of estimating speed according to FIGS. 6A-6B, respectively. Referring to FIG. 13A, at 1304 the vehicle detection module 604 identifies an object (e.g., a vehicle) in a frame of video captured using a camera. At 1308, the vehicle detection module 604 determines a bounding box around the object in the image.

At 1312, the Jacobian module 608 determines a Jacobian for the object based on the bounding box, as described above. At 1316, the speed module 612 determines a speed of the object based on the Jacobian, as described above.

Referring to FIG. 13B, control begins with 1350 where the vehicle detection module 604 identifies an object (e.g., a vehicle) in multiple frames of video captured over a period using a camera. At 1354, the vehicle detection module 604 determines bounding boxes around the object in the image.

At 1358, the Jacobian module 608 determines the Jacobians based on the bounding boxes, respectively. This produces a set of Jacobians for the period. At 1362, the homography module 610 determines a homography based on the Jacobians, as discussed above. At 1366, the speed module 612 determines the speed of the object using the homography, as discussed above.

In various implementations, average speed may be determined as described above. One or more other operations may be performed based on the speed, the average speed, or both, such as routing, traffic signal control, etc. Advantageously the disclosed systems and methods adapted to estimate the speed of objects that appear in videos without the need of camera calibration may be used independent of the camera used to record video with objects traveling in the frame of view. For example, the disclosed systems and methods may be used to determine the speed of objects traveling in video depicting a virtual environment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a detection module configured to:
detect an object on a surface in an image captured using a camera, the object being in contact with the surface in the image;
generate a two dimensional (2D) bounding box around the object; and
connect detected instances of the object over a series of images to form object tracks;
a Jacobian module configured to (a) generate a set of Jacobians for the object during different intervals of time based on the object tracks, the Jacobians mapping pixel coordinates to real world coordinates, wherein each of the Jacobians represent a local mapping between a pixel space of a first dimension and a distance space of a second dimension, wherein the second dimension is different than the first dimension, and to (b) generate a homography based on the set of Jacobians for the different intervals of time, the homography mapping pixel coordinates to the real world coordinates; and
a speed module configured to determine a speed that the object is traveling on the surface based on the homography over an interval of time.

2. The system of claim 1 wherein the Jacobian module is configured to generate the Jacobian using a neural network, wherein the neural network is trained based on minimizing the differences.

3. The system of claim 2 wherein the neural network is trained to regress Jacobians given bounding boxes around objects.

4. The system of claim 1 wherein the object is a vehicle.

5. The system of claim 1 wherein the bounding box is one of:
a two dimensional (2D) rectangle; and
a two dimensional (2D) polygon.

6. The system of claim 1 wherein a training module is configured to train the Jacobian module using an energy function that is one of:
an intersection over union error function; and
a scaled intersection over union error function.

7. A speed estimation system, comprising:
a detection module configured to:
detect an object on a surface in images captured using a camera over time during a period, the object being in contact with the surface in the images;
generate two dimensional (2D) bounding boxes around the object in the images, respectively; and
connect detected instances of the object over a series of images to form object tracks;
a Jacobian module configured to generate a set of Jacobians for the object during different intervals of time during the period based on the object tracks, each of the Jacobians representing a local mapping between a pixel space of a first dimension and a distance space of a second dimension, wherein the second dimension is different than the first dimension;
a homography module configured to generate a homography based on the set of Jacobians for the different intervals of time, the homography mapping pixel coordinates to real world coordinates; and
a speed module configured to determine a speed that the object is traveling on the surface using the homography generated based on the set of Jacobians over an interval of time.

8. The speed estimation system of claim 7 wherein the Jacobian module is configured to generate the set of Jacobians using a neural network.

9. The speed estimation system of claim 8 wherein the neural network is trained to regress Jacobians given bounding boxes around objects.

10. The speed estimation system of claim 7 wherein the object is a vehicle.

11. A system comprising:
the speed estimation system of claim 8; and
a training module configured to train the neural network by minimizing an energy function configured to generate energy values based on an error function between:
ones of the Jacobians; and
predetermined Jacobians, respectively.

12. The system of claim 11 wherein the energy function is one of:
an intersection over union error function;
a scaled intersection over union error function;
a L1 loss function; and
a normalized L1 loss function.

13. The speed estimation system of claim 7 wherein the homography module is configured to:
remove outlier ones of the Jacobians; and
determine the homography based on the remaining ones of the Jacobians of the set.

14. A method, comprising:
detecting an object on a surface in an image captured using a camera, the object being in contact with the surface in the image;
generating a two dimensional (2D) bounding box around the object;
connecting detected instances of the object over a series of images thereby forming object tracks;
by a neural network, generating a set of Jacobians for the object during different intervals of based on the object tracks, the Jacobians mapping pixel coordinates to real world coordinates, wherein each of the Jacobians represents a local mapping between a pixel space of a first dimension and a distance space of a second dimension, wherein the second dimension is different than the first dimension;
generating a homography based on the set of Jacobians for the different intervals of time, the homography mapping pixel coordinates to real world coordinates; and
determining a speed that the object is traveling on the surface based on the homography over an interval of time.

15. The method of claim 14 wherein the neural network is trained to regress Jacobians given bounding boxes around objects.

16. The method of claim 14 wherein the object is a vehicle.

17. The method of claim 14 wherein the bounding box is one of:
   a two dimensional (2D) rectangle; and
   a two dimensional (2D) polygon.

18. The method of claim 14 wherein generating the Jacobian includes generating the Jacobian using a neural network, and
   the method further comprises training the neural network by minimizing an energy function configured to generate energy values based on an error function between:
      the Jacobian; and
      a predetermined Jacobian.

19. The method of claim 18 wherein the training includes training the neural network using the energy function that is one of:
   an intersection over union error function; and
   a scaled intersection over union error function.

20. A speed estimation method, comprising:
   detecting an object on a surface in images captured using a camera over time during a period, the object being in contact with the surface in the image;
   generating two dimensional (2D) bounding boxes around the object in the images, respectively;
   connecting detected instances of the object over a series of images to form object tracks;
   generating a set of Jacobians for the object during different intervals of time during the period based on the object tracks, each of the Jacobians representing a local mapping between a pixel space of a first dimension and a distance space of a second dimension, wherein the second dimension is different than the first dimension;
   generating a homography based on the set of Jacobians for the different intervals of time, the homography mapping pixel coordinates to real world coordinates; and
   determining a speed that the object is traveling on the surface using the homography generated based on the set of Jacobians.

21. The speed estimation method of claim 20 wherein generating the set of Jacobians includes generating the set of Jacobians using a neural network.

22. The speed estimation method of claim 21 further comprising training the neural network to regress Jacobians given bounding boxes around objects.

23. The speed estimation method of claim 20 wherein the object is a vehicle.

24. The speed estimation method of claim 21 further comprising training the neural network by minimizing an energy function configured to generate energy values based on an error function between:
   ones of the Jacobians; and
   predetermined Jacobians, respectively.

25. The speed estimation method of claim 24 wherein the energy function is one of:
   an intersection over union error function;
   a scaled intersection over union error function;
   a L1 loss function; and
   a normalized L1 loss function.

26. The speed estimation method of claim 20 further comprising:
   removing outlier ones of the Jacobians; and
   determining the homography based on the remaining ones of the Jacobians of the set.

* * * * *